United States Patent
Tierney et al.

(10) Patent No.: US 10,176,640 B2
(45) Date of Patent: Jan. 8, 2019

(54) CONDUCTING DIGITAL SURVEYS UTILIZING VIRTUAL REALITY AND AUGMENTED REALITY DEVICES

(71) Applicant: QUALTRICS, LLC, Provo, UT (US)

(72) Inventors: Blake Andrew Tierney, Orem, UT (US); Milind Kopikare, Draper, UT (US); Larry Dean Cheesman, Provo, UT (US)

(73) Assignee: QUALTRICS, LLC, Provo, UT (US)

( * ) Notice: Subject to any disclaimer, the term of this patent is extended or adjusted under 35 U.S.C. 154(b) by 64 days.

(21) Appl. No.: 15/226,699

(22) Filed: Aug. 2, 2016

(65) Prior Publication Data

US 2018/0040161 A1 Feb. 8, 2018

(51) Int. Cl.
  *G09G 5/00* (2006.01)
  *G06T 19/00* (2011.01)
  *G06F 3/01* (2006.01)
  *G06F 3/0482* (2013.01)
  *H04L 29/08* (2006.01)
  *G06Q 30/02* (2012.01)

(52) U.S. Cl.
  CPC .......... *G06T 19/006* (2013.01); *G06F 3/011* (2013.01); *G06F 3/013* (2013.01); *G06F 3/015* (2013.01); *G06F 3/017* (2013.01); *G06F 3/0482* (2013.01); *G06Q 30/0203* (2013.01); *H04L 67/22* (2013.01); *H04L 67/303* (2013.01)

(58) Field of Classification Search
  None
  See application file for complete search history.

(56) References Cited

U.S. PATENT DOCUMENTS

| | | | |
|---|---|---|---|
| 8,606,645 B1 * | 12/2013 | Applefeld | G06T 19/006 705/14.25 |
| 8,666,978 B2 * | 3/2014 | Moganti | G06Q 30/0276 345/633 |
| 9,721,386 B1 * | 8/2017 | Worley, III | G06T 19/006 |
| 2002/0128898 A1 | 9/2002 | Smith et al. | |
| 2007/0078720 A1 | 4/2007 | Ravikumar et al. | |

(Continued)

OTHER PUBLICATIONS

U.S. Appl. No. 14/743,745, Nov. 2, 2017, Office Action.

(Continued)

*Primary Examiner* — David H Chu

(74) *Attorney, Agent, or Firm* — Keller Jolley Preece

(57) ABSTRACT

Embodiments of the present disclosure relate generally to generating, conducting, and reporting digital surveys utilizing augmented reality devices and/or virtual reality devices. In particular, in one or more embodiments, the disclosed systems and methods assist administrators in generating digital surveys utilizing interactive virtual environments via a virtual reality device and/or augmented reality elements via an augmented reality device. Similarly, the disclosed systems and methods can provide digital surveys via augmented reality devices and/or virtual reality devices, for instance, by monitoring user interactions via the augmented reality and/or virtual reality devices and providing digital surveys based on the monitored user interactions. Furthermore, the disclosed systems and methods can present survey results and allow administrators to interact with survey results utilizing augmented reality devices and/or virtual reality devices.

20 Claims, 18 Drawing Sheets

(56) References Cited

U.S. PATENT DOCUMENTS

| | | |
|---|---|---|
| 2008/0114845 A1 | 5/2008 | Rao |
| 2011/0196801 A1 | 8/2011 | Ellis et al. |
| 2011/0231424 A1* | 9/2011 | Avdanina .......... G06F 17/30176 |
| | | 707/769 |
| 2011/0256520 A1* | 10/2011 | Siefert ................... G09B 5/10 |
| | | 434/322 |
| 2012/0192235 A1* | 7/2012 | Tapley ............. H04N 21/44016 |
| | | 725/60 |
| 2012/0237918 A1 | 9/2012 | Kaida |
| 2013/0054435 A1 | 2/2013 | Zhang et al. |
| 2013/0086077 A1* | 4/2013 | Piippo ............... G06Q 30/0259 |
| | | 707/748 |
| 2013/0173461 A1* | 7/2013 | Levy .................. G06Q 20/322 |
| | | 705/39 |
| 2013/0293580 A1* | 11/2013 | Spivack ............ G06Q 30/0643 |
| | | 345/633 |
| 2013/0314421 A1* | 11/2013 | Kim ...................... G09B 5/065 |
| | | 345/427 |
| 2013/0335573 A1* | 12/2013 | Forutanpour ........... G06F 3/011 |
| | | 348/158 |
| 2014/0129354 A1* | 5/2014 | Soon-Shiong ......... G06Q 30/06 |
| | | 705/16 |
| 2014/0139551 A1* | 5/2014 | McCulloch .......... G02B 27/017 |
| | | 345/633 |
| 2014/0225922 A1* | 8/2014 | Sbardella .............. G06T 19/006 |
| | | 345/633 |
| 2014/0298260 A1 | 10/2014 | Abowd et al. |
| 2014/0330618 A1 | 11/2014 | Wong et al. |
| 2014/0375683 A1* | 12/2014 | Salter ...................... G06F 3/013 |
| | | 345/633 |
| 2016/0055674 A1* | 2/2016 | Mullins ................. G06T 19/006 |
| | | 345/633 |
| 2016/0217620 A1* | 7/2016 | Constantinides ..... G06T 19/006 |
| 2016/0313877 A1 | 10/2016 | Ha et al. |
| 2016/0370954 A1 | 12/2016 | Burningham et al. |
| 2017/0039613 A1* | 2/2017 | Kaehler ............. G02B 27/0172 |
| 2017/0039988 A1 | 2/2017 | Whiting et al. |
| 2017/0180980 A1 | 6/2017 | Courtright et al. |
| 2017/0293958 A1* | 10/2017 | Tang .................. G06Q 30/0621 |
| 2017/0323481 A1* | 11/2017 | Tran ...................... G06T 19/006 |
| 2017/0365101 A1* | 12/2017 | Samec ............. G02B 27/0172 |
| 2018/0004283 A1* | 1/2018 | Mathey-Owens ...... G06F 3/013 |
| 2018/0060883 A1 | 3/2018 | Cheesman et al. |

OTHER PUBLICATIONS

U.S. Appl. No. 14/816,983, Jan. 19, 2018, Office Action.
U.S. Appl. No. 14/743,745, May 14, 2018, Office Action.
U.S. Appl. No. 14/816,983, Jul. 27, 2018, Office Action.

* cited by examiner

CONDUCTING DIGITAL SURVEYS UTILIZING VIRTUAL REALITY AND AUGMENTED REALITY DEVICES

BACKGROUND

Recent years have seen rapid development in the areas of virtual and augmented reality. Indeed, users can now utilize virtual reality headsets or augmented reality glasses to step into a virtual world or overlay augmented digital features onto human perception of the real world. Accordingly, the use of virtual reality and augmented reality devices is increasing as the technology continues to increase.

Although conventional virtual reality and augmented reality systems are opening doors to new avenues for users to experience the world (or the virtual world), such systems have a number of shortcomings. For example, individuals and businesses are increasingly seeking ways to obtain additional user information and user feedback in relation to utilization of virtual and augmented reality devices. Conventional digital survey systems lack digital survey tools that allow individuals and businesses to gather data from users regarding their preferences, opinions, and experiences while utilizing virtual and augment reality devices. Moreover, conventional digital survey systems lack tools for gathering digital survey data and reporting digital survey results utilizing virtual and augmented reality devices.

Furthermore, conventional digital survey systems often require administrators to create several different digital surveys for different platforms. Accordingly, administrators must expend significant time and computing resources in generating digital surveys for individual distribution channels, such as websites, e-mail, augmented reality, and/or virtual reality.

Accordingly, there are a number of considerations to be made in relation to digital surveys in relation to virtual and augmented reality devices.

SUMMARY

One or more embodiments disclosed herein provide benefits and/or solve one or more of the foregoing or other problems in the art with systems and methods for creating, presenting, and/or reporting digital surveys via virtual reality and/or augmented reality devices. In particular, the disclosed systems and methods can generate digital surveys for utilization in virtual reality and/or augmented reality devices by detecting user interactions (e.g., by digital survey respondents or administrators) via virtual reality and/or augmented reality devices. Moreover, the disclosed systems and methods can provide digital surveys to respondents via virtual reality and/or augmented reality devices through virtual elements in a virtual environment or through augmented reality elements overlaid on a view of the real world. Furthermore, the disclosed systems and methods can present results of digital surveys via virtual reality and/or augmented reality devices to digital survey administrators.

For example, in one or more embodiments, the disclosed systems and methods identify a user interaction with a real-world environmental component from data received from an augmented reality device of a user. Moreover, the disclosed systems and methods determine a survey question to provide to the user of the augmented reality device in response to the identified user interaction with the real-world environmental component. In addition, the disclosed systems and methods provide a digital survey indicator as an augmented reality element for display to the user in relation to the real-world environmental component and provide for presentation to the user the survey question as an augmented reality element based on receiving an indication of user interaction with the digital survey indicator. Furthermore, the disclosed systems and methods receive response data collected from the augmented reality device in response to the survey question.

Similarly, in one or more embodiments, the disclosed systems and methods maintain a user profile of a user of a virtual reality device by monitoring user interactions of the user in relation to a virtual environment. Based on identifying a new user interaction associated with the user in the virtual environment, the disclosed systems and methods provide a digital survey indicator for display to the user in the virtual environment via the virtual reality device. In addition, the disclosed systems and methods analyze the user profile and the monitored user interactions of the user of the virtual reality device to determine a survey question to provide to the user. Based on receiving an indication of a user interaction with the digital survey indicator in the virtual environment, the disclosed systems and methods provide the survey question for presentation to the user in the virtual environment. Furthermore, the disclosed systems and methods receive response data collected from the virtual reality device in response to the survey question.

By generating digital surveys based on user interactions with augmented reality and/or virtual reality devices, the disclosed systems and methods can generate targeted digital surveys to particular respondents using augmented reality and/or virtual reality devices. In addition, the disclosed systems and methods can time the presentation of digital surveys (or digital survey indicators) at more convenient and appropriate moments for users of augmented reality and/or virtual reality devices. Accordingly, the disclosed systems and methods can reduce user frustration and increase response rates of digital surveys via augmented reality and/or virtual reality devices.

Moreover, by providing digital surveys via augmented reality and/or virtual reality devices, the disclosed systems and methods provide a more entertaining and engaging method of administering digital surveys. Indeed, the disclosed systems and methods can provide digital surveys utilizing augmented reality elements overlaid on a view of the real world (or virtual elements in a virtual environment) to generate digital surveys that are more appealing and engrossing to a respondent. As a result, the disclosed systems and methods also can increase participation and response rates in comparison to traditional digital surveys.

Furthermore, by providing digital survey results to administrators utilizing augmented reality and/or virtual reality devices, the disclosed systems and methods can make survey data results more useful and engaging. Indeed, the disclosed systems and methods can provide digital survey results in relation to augmented reality elements that allow administrators to view digital survey results in relation to real-world objects, products, individuals, and environments. Similarly, the disclosed systems and methods can provide digital survey results in virtual interactive environments in relation to virtual objects, products, or individuals. In this manner, digital survey administrators can visualize and utilize digital survey results more easily, efficiently, and significantly. Moreover, digital survey administrators can obtain updated digital survey results, in real-time, utilizing augmented reality devices, simply by looking at objects corresponding to digital survey results.

In addition, in one or more embodiments, the disclosed systems and methods convert existing digital surveys to digital augmented reality and/or virtual reality surveys. In this manner, the disclosed systems and methods can reduce the time and computing resources required to generate and provide digital surveys in relation to augmented reality and/or virtual reality devices.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not considered to be limiting, embodiments will be described and explained with additional specificity and detail through the use of the accompanying drawings in which.

DETAILED DESCRIPTION

Figure 1:
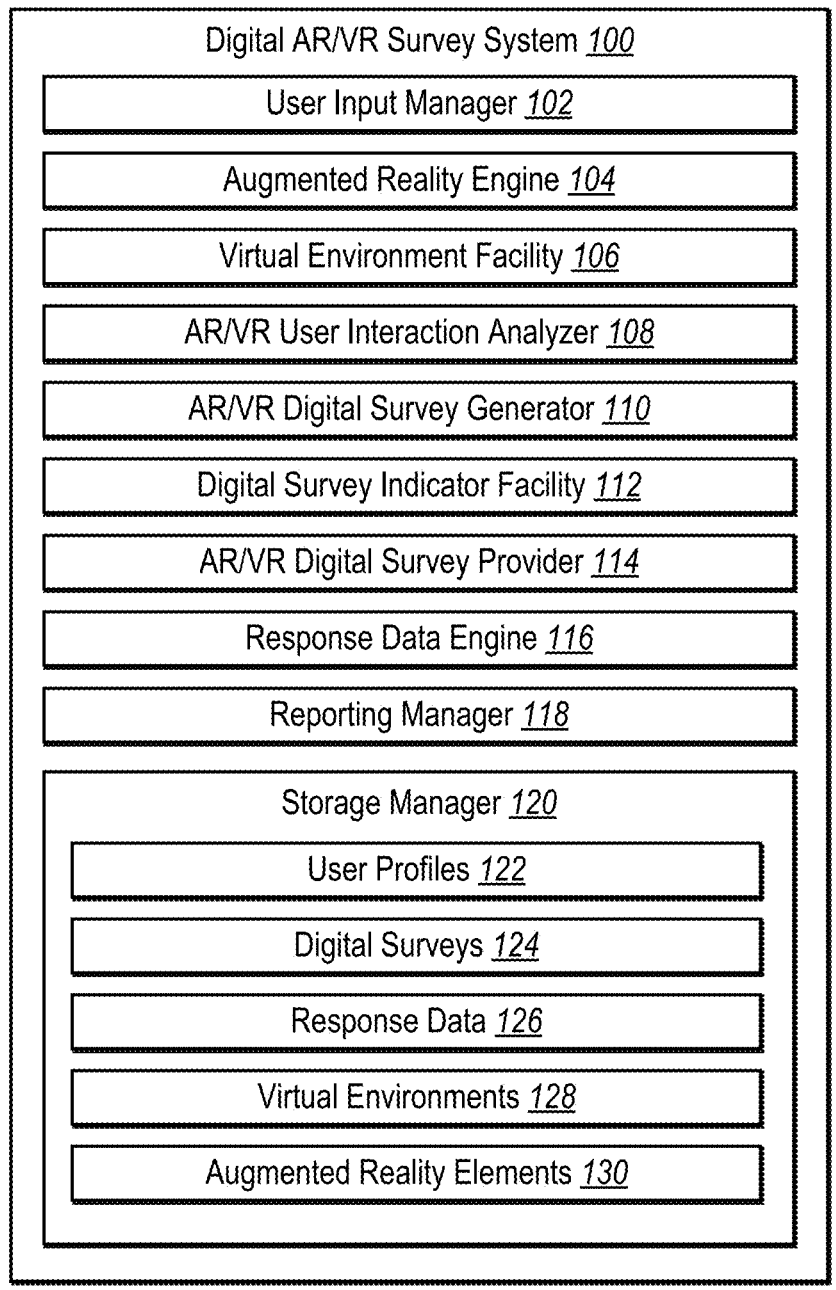
FIG. 1 illustrates a schematic diagram of a digital AR/VR survey system in accordance with one or more embodiments.

One or more embodiments disclosed herein provide a digital augmented reality and virtual reality survey system ("digital AR/VR survey system") that creates, presents, and/or reports digital surveys via augmented reality devices and/or virtual reality devices ("AR/VR devices"). In particular, in one or more embodiments the digital AR/VR survey system identifies user interaction via an AR/VR device and generates digital surveys based on the identified user interaction. For instance, the digital AR/VR survey system can identify user interactions with an AR/VR device and provide an indication of a digital survey for display via the AR/VR device in response to the identified user interactions. Similarly, the digital AR/VR survey system can identify user interactions with an AR/VR device, select survey questions based on the user interactions, and provide the survey questions for display via the AR/VR device. Furthermore, the digital AR/VR survey system can collect response data based on a user interacting with a survey question presented utilizing the AR/VR device. Upon receiving and/or analyzing response data, the AR/VR survey system can provide digital survey results and digital survey reports for presentation to survey administers utilizing AR/VR devices.

For example, in one or more embodiments, the digital AR/VR survey system identifies a user interaction with a real-world environmental component from data received from an augmented reality device of a user. Moreover, based at least in part on the identified user interaction with the real-world environmental component, the digital AR/VR survey system determines a survey question to provide to the user of the augmented reality device. In addition, the digital AR/VR survey system provides a digital survey indicator as an augmented reality element for display to the user in relation to the real-world environmental component. Based on receiving an indication of user interaction with the digital survey indicator, the digital AR/VR survey system provides for presentation to the user the survey question as an augmented reality element. Furthermore, the digital AR/VR survey system receives response data collected from the augmented reality device in response to a user interacting with the survey question.

In addition, in one or more embodiments, the digital AR/VR survey system maintains a user profile of a user of a virtual reality device by monitoring user interactions in relation to a virtual environment. Based on identifying a new user interaction associated with the user in the virtual environment, the digital AR/VR survey system provides a digital survey indicator for display to the user in the virtual environment via the virtual reality device. Moreover, the digital AR/VR survey system analyzes the user profile and the monitored user interactions of the user of the virtual reality device to determine a survey question to provide to the user. Based on receiving an indication of user interaction with the digital survey indicator in the virtual environment, the digital AR/VR survey system provides for presentation to the user the survey question in the virtual environment, and receives response data collected from the virtual reality device in response to the survey question.

As mentioned previously, in one or more embodiments, the digital AR/VR survey system creates digital surveys for utilization via an AR/VR device. For example, in one or more embodiments, the digital AR/VR survey system enables survey administrators to create a digital survey based on user interaction with an AR/VR device. For instance, in one or more embodiments, the digital AR/VR survey system provides an interactive user interface to administrators via an AR/VR device for creation of a digital survey. To illustrate, the digital AR/VR survey system can generate a virtual reality and/or augmented reality interview utilizing a digital avatar that enables administrators to create a digital survey. Similarly, in one or more embodiments, the digital AR/VR survey system generates a three-dimensional survey editor for utilization by an AR/VR device for building a digital survey.

In addition to creating digital surveys via AR/VR devices, the digital AR/VR survey system can also create digital surveys utilizing other methods. For example, in one or more embodiments, the digital AR/VR survey system utilizes a survey translator to convert existing digital surveys into digital surveys for utilization by AR/VR devices. For example, in one or more embodiments, the digital AR/VR survey system can automatically translate an existing digital survey corresponding to a first distribution channel (e.g., a survey for a website) into a digital survey for AR/VR devices.

Moreover, as mentioned previously, the digital AR/VR survey system can also generate digital surveys based on user interactions with an AR/VR device. For example, the digital AR/VR survey system can maintain user profiles in relation to user interactions (e.g., user interactions with objects, locations visited, purchases) of users of AR/VR devices. The digital AR/VR survey system can analyze user profiles and user interactions to generate digital surveys. For example, the digital AR/VR survey system can determine how users interact with particular products, locations, or objects and generate survey questions based on the detected user interactions.

In addition to creating digital surveys, the digital AR/VR survey system can also administer digital surveys to one or more users of AR/VR devices. For example, the digital AR/VR survey system can provide an indication of an available digital survey via an AR/VR device, provide the digital survey via the AR/VR device, receive responses to the digital survey via the AR/VR device, and/or adjust or customize the digital survey based on the responses received in relation to the AR/VR device.

To illustrate, in one or more embodiments, the digital AR/VR survey system can provide a digital survey indicator via an AR/VR device (e.g., a digital image, symbol, icon, sound, noise, or graphic indicating an available digital survey). In particular, the digital AR/VR survey system can provide a digital survey indicator in relation to a virtual object in a virtual environment, an augmented reality element, or a real world environmental component. For example, the digital AR/VR survey system can generate a digital survey corresponding to a particular product, and then provide a digital survey indicator within a proximity of the particular product via an augmented reality device. Thus, for example, the digital AR/VR survey system can provide a digital survey regarding a particular phone model via an augmented reality device such that the digital survey appears to float near the phone. Similarly, the digital AR/VR survey system can provide a digital survey regarding a virtual location via a virtual reality device, and then provide a digital survey indicator at (or near) the virtual location.

The digital AR/VR survey system also analyzes user interactions to determine a time to provide a digital survey and/or digital survey indicator. For example, the digital AR/VR survey system can identify a user interaction (e.g., with a virtual element, augmented reality element, or real-world environmental component) and provide a digital survey indicator via an AR/VR device in response to the user interaction. For example, the digital AR/VR survey system can detect user interactions via a virtual reality device that indicate a user has completed an activity (e.g., completed a virtual game or a virtual shopping trip) in a virtual environment, and, in response, provide a digital survey indicator. Similarly, the digital AR/VR survey system can detect via an augmented reality device that a user is engaged in a particular activity (e.g., eating at a particular restaurant), and based on the particular activity, provide a digital survey indicator. In this manner, the digital survey indicator can time invitations to take digital surveys to avoid interruptions, reduce frustration experienced by users, and increase the number of survey responses.

As mentioned above, the digital AR/VR survey system can present survey questions via an AR/VR device. For example, upon user interaction with a digital survey indicator, the digital AR/VR survey system can provide one or more survey questions via the AR/VR device. To illustrate, the digital AR/VR survey system can generate a digital survey room in a virtual environment and present digital surveys (e.g., text or auditory questions) within the digital survey room. Similarly, the digital AR/VR survey system can provide text of a digital survey as an augmented reality element via an augmented reality device.

The digital AR/VR survey system can also utilize AR/VR devices to target surveys to particular respondents. To illustrate, the digital AR/VR survey system can monitor user interactions via an AR/VR device to determine that an individual has utilized a particular product, participated in a particular activity, or visited a particular location (e.g., in a virtual environment or in the real world). The digital AR/VR survey system can target particular respondents to receive a digital survey based on these determined user interactions.

After presenting a respondent with a digital survey indicator and/or a digital survey question, the digital AR/VR survey system can also receive responses to a digital survey via AR/VR devices. For example, the digital AR/VR survey system can provide one or more survey question elements or components with which a user can interact to provide a response to a digital survey question. For instance, the AR/VR survey system can receive gestures, visual cues (e.g., a direction a user is looking or facing), auditory responses, movements, and/or other user interactions with an AR/VR device to determine responses to a digital survey.

Furthermore, in addition to administering digital surveys via an AR/VR device, the digital AR/VR survey system can also present results of digital surveys via an AR/VR device. For example, in one or more embodiments, the digital AR/VR survey system can present for display digital survey results via an augmented reality device as one or more augmented reality elements. To illustrate, the digital AR/VR survey system can provide survey results related to a plurality of products by providing, via an augmented reality device, augmented reality elements overlaid on a view of the plurality of products. Similarly, the digital AR/VR survey system can provide for display digital survey results regarding a plurality of products in a virtual environment by generating virtual objects corresponding to the plurality of products and the survey results.

As mentioned above, the digital AR/VR survey system provides a number of advantages to survey administrators and respondents over existing survey systems. For instance, utilizing AR/VR devices, the digital AR/VR survey system provides survey administrators with more engaging, streamlined, and detailed methods of generating digital surveys. Furthermore, the digital AR/VR system allows administrators to target particular respondents utilizing AR/VR devices (at appropriate times) to increase digital survey participation and decrease respondent frustration.

In addition, by utilizing digital survey indicators, the digital AR/VR survey system provides respondents with a less intrusive manner of identifying available digital surveys. Moreover, the digital AR/VR survey system provides respondents with a more entertaining and engaging manner of responding to digital surveys. In addition, the digital AR/VR survey system provides engaging and unique methods for reporting digital survey results to administrators via AR/VR devices.

The digital AR/VR survey system also improves functioning of AR/VR devices and other computing devices implementing the digital AR/VR survey system. For example, by targeting particular respondents, the digital AR/VR survey system can reduce the number of digital surveys and the memory and processor requirements in relation to implementing digital surveys via corresponding computing devices. Similarly, as discussed above, in one or more embodiments, the digital AR/VR survey system converts existing digital surveys to AR/VR digital surveys. Accordingly, the digital AR/VR survey system can reduce the burden on computing devices to generate new AR/VR digital surveys by utilizing existing digital surveys together with an AR/VR survey conversion tool.

As used herein, the term "digital survey" refers to an electronic communication used to collect information. For example, the term digital survey may include an electronic communication in the form of a poll, questionnaire, census, or other type of sampling. Similarly, the term digital survey may include an electronic communication seeking a response from a respondent. Further, the term digital survey as used herein may generally refer to a method of requesting and collecting response data from respondents via AR/VR devices.

Additionally, as used herein, the term "respondent" refers to a person who participates in, and responds to, a digital survey. In particular, respondent includes a user of an AR/VR device that responds to a digital survey via the AR/VR device.

Furthermore, as used herein, the term "survey question" refers to prompts included in a digital survey that invoke a response from a respondent. Example types of questions include, but are not limited to, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. In one or more embodiments, a survey question may comprise a question portion as well as an available answer choice portion that corresponds to the survey question. Similarly, a survey question may comprise instructions for performing an action that invokes a physical response from a respondent.

Moreover, as used herein, the term "response" or "response data" refers to any type of electronic data generated in response to an action by a respondent. The electronic data may include content and/or feedback from the respondent in response to a survey question. Depending on the question type, the response may include, but is not limited to, a selection, a text input, an indication of an answer selection, a user provided answer, and/or an attachment. For example, a response may include content, such as a free-form text response provided by a respondent. Similarly, a response may include a physical action (e.g., gesture, movement, eye/head movement, etc.), interaction with an augmented reality element, interaction with a real-world object, or action within a virtual environment (e.g., movement of an avatar). Similarly, a response may include biometric data measured by a computing device. For example, response data may include heart rate, blood pressure, body temperature, breathing rate, or moisture readings (e.g., perspiration data). Response data can also include other metrics from an AR/VR device. For instance, response data can include how long a user interacts with an object (e.g., how long a user looked at a virtual element, real-world environmental component, or augmented reality element), what portions of an object a user interacts with an object (e.g., a user looked at the cover of a book, but did not open it), or how long an individual stayed at a particular location, and/or objects a user views.

As used herein, the term "augmented reality device" refers to a computing device that provides a modified view of the real world. In particular, the term "augmented reality device" includes a computing device that digitally augments a contemporaneous view of the real-world with computer-generated sensory input, such as sound, images, video, graphics, or data. For example, an augmented reality device includes an augmented reality headset or augmented reality glasses that include one or more lenses or display screens that permit a user to view the real word together with augmented reality elements. Similarly, an augmented reality device can be implemented as part of another device or object. For example, an augmented reality device can be implemented as part of a smart phone or tablet (e.g., a touchscreen of a smart phone can augment a contemporaneous view of the real-world captured by a digital camera); as a windshield or other glass viewing area (e.g., windshield of a vehicle, plane, boat or train); or as part of a lens (e.g., contact lenses). Similarly, an augmented reality device can include devices that project images onto the eye as augmented reality elements, such as devices that project holograms or other visual representations. Moreover, an augmented reality device can include a device that modifies brain signals to include augmented reality elements (e.g., an implant to the eye, optical nerves, or brain that add augmented reality elements to vision signals).

An augmented reality device can also include a camera, microphone, or other data capturing devices capable of capturing environmental data. For example, an augmented reality device can utilize a camera to capture environmental data to enable the augmented reality device to properly overlay augmented reality elements in relation to a real world view. Moreover, an augmented reality device can utilize cameras, microphones, or other data capturing devices to capture real-world environmental components. In addition, an augmented reality device can include one or more sensors that detect user interaction. For example, an augmented reality device can comprise a camera, optical sensors, clothing, gloves, accelerometers, and/or other sensors to detect movements and/or hand gestures of a user. Moreover, an augmented reality device can include one or more biometric sensors.

In addition, as used herein, the term "augmented reality element" refers to a digital item produced by an augmented reality device that modifies a view of the real world. An augmented reality element includes digital images, digital video, digital renderings, and/or digital audio or sound provided by an augmented reality device.

Moreover, as used herein, the term "real-world environmental component" refers to an action, object, sound, characteristic, or thing in the real world. To illustrate, a real-world environmental component can include an object, such as a physical desk. In addition, a real-world environmental component can include an action, such as placing a cup on the physical desk. Similarly, a real-world environmental component includes engaging in particular activities (e.g., playing a particular game) or interacting with particular products (e.g., drinking a particular product brand of soda).

As used herein, the term "environmental data" refers to data captured by a computing device regarding a real-world environment. In particular, environmental data can include image data, video data, audio data, temperature data, location data (e.g., geolocation or GPS), and/or biometric data captured by an AR/VR device. As described in greater detail below, the digital AR/VR survey system can utilize environmental data from an augmented reality device to identify one or more real-world environmental components.

Furthermore, as used herein, the term "virtual reality device" refers to a computing device that generates a digital, three-dimensional representation of a virtual environment. In particular, the term "virtual reality device" includes a computing device (e.g., a headset or head-mounted display) that generates a digital, three-dimensional view of a virtual environment that simulates a user's physical presence through a generated sensory experience. To illustrate, a virtual reality device includes a head-mounted display that generates an immersive three-dimensional representation of a virtual environment that modifies a view of the virtual environment based on user movements to simulate physical presence in the virtual environment. Moreover, a virtual reality device can also comprise one or more sensors that detect user interaction. For example, a virtual reality device can comprise optical sensors, clothing, gloves, or other sensors to detect movements and/or hand gestures of a user. Similarly, the virtual reality device can comprise a user input device, such as a controller, remote control, joystick, or keyboard. In addition, a virtual reality device can include one or more biometric sensors to detect heart rate, blood pressure, body temperature, breathing rate, or moisture readings (e.g., perspiration data).

Moreover, as used herein, the term "virtual environment" refers to a simulation of a physical presence in a setting or location (real or imagined, regardless of size). For example, a virtual environment can comprise a simulation of a physical presence in a building, a city, a market, a forest, a planet, outer space, a cell, or a particle.

Additional detail will now be provided regarding the digital AR/VR survey system in relation to illustrative figures portraying exemplary embodiments. In particular, FIG. 1 provides additional detail regarding components of a digital AR/VR survey system in accordance with one or more embodiments. Moreover, with regard to FIG. 2, additional description is provided regarding an environment in which the digital AR/VR survey system can operate. Thereafter, FIGS. 3A-3B, FIGS. 4A-4G, FIGS. 5A-5I, and FIGS. 6A-6B provide additional detail regarding creating digital surveys, administering digital surveys via an augmented reality device, administering digital surveys via a virtual reality device, and reporting results of a digital survey, in accordance with one or more embodiments.

As mentioned, FIG. 1 illustrates an embodiment of an exemplary digital AR/VR survey system 100. The digital AR/VR system 100 can generate and administer digital surveys as well as report survey results in relation to AR/VR devices. As shown, the digital AR/VR survey system 100 includes a user input manager 102, an augmented reality engine 104, a virtual environment facility 106, an AR/VR user interaction analyzer 108, an AR/VR digital survey generator 110, a digital survey indicator facility 112, an AR/VR digital survey provider 114, a response data engine 116, a reporting manager 118, and a storage manager 120 (comprising user profiles 122, digital surveys 124, response data 126, virtual environments 128, and augmented reality elements 130).

The components 102-130 of the digital AR/VR survey system 100 can comprise software, hardware, or both. For example, the components 102-130 can comprise one or more instructions stored on a computer-readable storage medium and executable by processors of one or more computing devices. When executed by the one or more processors, the computer-executable instructions of the digital AR/VR survey system 100 can cause a client device (e.g., an AR/VR device) and/or a server device to perform the methods described herein. Alternatively, the components 102-130 can comprise hardware, such as a special purpose processing device to perform a certain function or group of functions. Additionally, the components 102-130 can comprise a combination of computer-executable instructions and hardware.

Furthermore, the components 102-130 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 102-130 may be implemented as a stand-alone application, such as a desktop or mobile application. Furthermore, the components 102-130 may be implemented as one or more web-based applications hosted on a remote server. The components 102-130 may also be implemented in a suit of mobile device applications or "apps."

As mentioned above, and as illustrated in FIG. 1, the digital AR/VR survey system 100 may include the user input manager 102. The user input manager 102 can obtain, identify, receive, monitor, capture, or detect user input and/or user interactions in relation to a computing device or input device, including an AR/VR device. As referred to herein, a "user interaction" refers to conduct performed by a user (or a lack of conduct performed by a user). In particular, "user interaction" includes conduct performed by a user to control the function of a computing device (e.g., an AR/VR device). "User input," as used herein, refers to input data generated in response to a user interaction.

The user input manager 102 can identify or detect a user interaction or user input with respect to a variety of user interface elements, virtual elements, real-world environmental components, and/or augmented reality elements. For example, in relation to a virtual reality device, the user input manager 102 can identify or detect selection of a graphical button portrayed as part of a virtual environment via a virtual reality device. Similarly, the user input manager 102 can identify or detect selection of an augmented reality element overlaying a view of the real world. In addition, the user input manager 102 can identify or detect user interaction with a real-world environmental component (e.g., picking up a physical object). The user input manager 102 can also obtain, identify, receive, monitor, capture, or detect environmental data. For example, the user input manager 102 can receive digital images, digital video, digital audio, biometric data, or other environmental data from an AR/VR device.

In addition to the user input manager 102, and as shown in FIG. 1, the digital AR/VR survey system 100 can also include the augmented reality engine 104. The augmented reality engine 104 can create, generate, modify, manage, and/or provide augmented reality elements (e.g., as part of an augmented reality user interface). In particular, based on user input and environmental data captured and received from an augmented reality device (e.g., collected via the user input manager 102), the augmented reality engine 104 can create, generate, and/or provide augmented reality elements as an overlay to a view of the real world.

For example, based on environmental data, the augmented reality engine 104 can generate an augmented reality user interface with augmented reality elements. For example, the augmented reality engine 104 can receive a video feed showing a real-world environmental component (e.g., a desk), generate an augmented reality element (e.g., a three-dimensional image of a cup), and provide the augmented reality element such that it appears in relation to the real-world environmental component (e.g., such that the three-dimensional image of the cup appears to rest on the desk, even as a user moves or changes perspective with respect to the desk).

The augmented reality engine 104 can generate various augmented reality elements for providing a variety of types of information, including text, images, video, audio, characters, or other information. Moreover, the augmented reality engine 104 can display information in a user interface via a variety of element types, such as display icons, dialogue boxes, banners, buttons, pop-ups, text boxes, or selection menus.

As illustrated in FIG. 1, in addition to the augmented reality engine 104, the digital AR/VR survey system 100 also includes the virtual environment facility 106. The virtual environment facility 106 can generate, create, modify, manage, and/or provide a virtual environment. For instance, the virtual environment facility 106 can create a virtual environment comprising virtual objects, virtual individuals, virtual locations, virtual currency, and/or virtual products.

Moreover, the virtual environment facility 106 can provide a user interface portraying a virtual environment to a virtual reality device. In particular, the augmented reality engine 104 can generate and/or provide a three-dimensional representation of a virtual environment. For example, the augmented reality engine 104 can generate and/or provide a three-dimensional representation of a virtual environment that adjusts to simulate a physical presence in the virtual environment. Furthermore, the virtual environment facility 106 can generate various user interface elements in the virtual environment for providing a variety of types of information, including text, images, video, audio, characters, or other information (e.g., display icons, dialogue boxes, banners, buttons, pop-ups, text boxes, or selection menus).

The virtual environment facility 106 can also modify a virtual environment based on user interaction from one or more users. For example, the virtual environmental facility 106 can generate a three-dimensional representation of other users within a virtual environment. Accordingly, a user can meet and interact with other users in real time. The virtual environmental facility 106 can modify the virtual environment as users move through and/or otherwise interact with the virtual environment.

As shown in FIG. 1, the digital AR/VR survey system 100 can also include the AR/VR user interaction analyzer 108. The AR/VR user interaction analyzer 108 can analyze, track, monitor, identify, gather, collect, determine, and/or detect user interactions (or user input) in relation to AR/VR devices. For instance, the AR/VR user interaction analyzer 108 can analyze user interactions to identify particular, activities, events, objects, or conduct within a virtual environment. Similarly, the AR/VR user interaction analyzer 108 can analyze user interactions with augmented reality elements and/or real-world environmental components to identify particular activities, events, objects, or conduct via an augmented reality device.

To illustrate, the AR/VR user interaction analyzer 108 can analyze user input and/or environmental data from a virtual reality device to determine that a user is playing a virtual game, is at a virtual location, or has just completed a particular activity in a virtual environment. Similarly, the AR/VR user interaction analyzer 108 can analyze user input or environmental data from an augmented reality device to determine that a user is eating at a particular restaurant, utilizing a particular product, or moving from one real world location to another.

Accordingly, in one or more embodiments, the AR/VR user interaction analyzer 108 comprises one or more object recognition, facial recognition, or activity recognition algorithms. For example, the AR/VR user interaction analyzer 108 can utilize facial recognition technology to identify an individual from a video feed provided via an augmented reality device. Similarly, the AR/VR user interaction analyzer 108 can identify objects and portions of objects from a digital image received from an augmented reality device. Moreover, the AR/VR user interaction analyzer 108 can analyze a video feed from an augmented reality device and identify that a user engages in particular conduct, such as eating, drinking, shopping, pressing a button, etc.

Moreover, as discussed in greater detail below, in one or more embodiments, the digital AR/VR survey system 100 utilizes one or more triggering events. For instance, the digital AR/VR survey system 100 can utilize one or more triggering events to determine when to provide a digital survey indicator, when to provide a digital survey, and/or what digital survey question to provide. The AR/VR user interaction analyzer 108 can analyze user interactions and environmental data to determine the satisfaction of one or more triggering events.

Furthermore, the AR/VR user interaction analyzer 108 can identify and record a variety of metrics in relation to user interaction with an AR/VR device. For instance, the AR/VR user interaction analyzer 108 can determine a number of user interactions (e.g., a number of times a user views an advertisement or virtual advertisement, a number of times a user utilizes a product or virtual product, a number of times a user performs an activity or virtual activity), a duration of a user interaction (e.g., how long a user looks at an advertisement or virtual advertisement, how long a user utilizes a product or virtual product, how long a user performs an activity or virtual activity), a location of user interactions, or other individuals or businesses a user interacts with (e.g., a number of people a user interacts with when watching media, other individuals a user interacts with in playing virtual games). The digital AR/VR survey system 100 can utilize such metrics to identify target respondents, determine timing of providing digital surveys, select digital surveys and/or survey questions, identify satisfaction of triggering events, and/or in gathering response data.

As shown in FIG. 1, the digital AR/VR survey system 100 can also include the AR/VR digital survey generator 110. The AR/VR digital survey generator 110 can create or generate one or more digital surveys for utilization via an AR/VR device. In particular, the AR/VR digital survey generator 110 can assist an administrator in generating a digital survey utilizing an AR/VR device, can generate a digital survey for an AR/VR device from an existing digital survey, or can generate a digital survey based on user interaction from one or more users of an AR/VR device.

For instance, in one or more embodiments, the AR/VR digital survey generator 110 utilizes an AR/VR device to assist an administrator in generating a digital survey. For example, the AR/VR digital survey generator 110 can provide one or more augmented reality elements via an augmented reality device to assist an administrator in generating a digital survey. Similarly, the AR/VR digital survey generator 110 can provide a virtual environment to assist an administrator in generating a digital survey. To illustrate, the AR/VR digital survey generator 110 can provide a digital avatar as an augmented reality element (or a virtual reality element) to guide an administrator in generating a digital survey. For instance, the digital avatar can interact with real-world environmental components (e.g., administrator products), ask questions to an administrator, and provide additional augmented reality elements to generate a digital survey for respondents. Similarly, the digital avatar can interact with virtual products via a virtual environment to assist an administrator in generating a digital survey.

Furthermore, the AR/VR digital survey generator 110 can also translate an existing digital survey to a digital survey for utilization via an AR/VR device. In particular, the AR/VR digital survey generator 110 can determine characteristics of a digital survey in an original environment (e.g., instant message digital surveys, point of sale digital surveys, or website digital surveys) and transform the digital survey for utilization via an AR/VR device based on the determined characteristics.

In addition, the AR/VR digital survey generator 110 can also generate a digital survey (e.g., survey questions) based on user interaction in relation to an AR/VR device. For instance, the AR/VR digital survey generator 110 can receive an indication (e.g., via the AR/VR user interaction analyzer 108) that a user is having difficulty utilizing a particular product. The AR/VR digital survey generator 110 can generate a digital survey based on the indication (e.g., generate a survey question regarding the nature of the difficulty utilizing the particular product).

The AR/VR digital survey generator 110 can define, create, and/or generate a variety of digital survey features in creating a digital survey. For instance, the AR/VR digital survey generator 110 can determine survey question content (e.g., text, images, video, elements, options, or instructions to provide in survey questions). Moreover, the AR/VR digital survey generator 110 can define user interactions to track in identifying response data (e.g., gestures, interactions with elements, biometric data). In addition, the AR/VR digital survey generator 110 can determine one or more times to provide digital surveys, one or more locations to provide digital surveys (e.g., locations in a virtual environment and/or locations in the real world as viewed through an augmented reality device), one or more target respondents, an order of providing survey questions, one or more decision-trees or algorithms indicating what survey questions to provide in relation to user interactions and/or response data, and/or triggering events corresponding to a digital survey (e.g., to determine what digital survey to provide, when to provide it, where to provide it, and whom to provide it to).

The AR/VR digital survey generator 110 can also generate similar features in relation to a digital survey indicator. For example, the AR/VR digital survey generator 110 can define an appearance of a digital survey indicator (e.g., digital image, sound, digital video, etc.), one or more times to provide a digital survey indicator, one or more locations to provide a digital survey indicator, one or more target respondents, and/or triggering events corresponding to a digital survey (e.g., to determine what digital survey indicator to provide, when to provide it, where to provide it, and whom to provide it to).

In addition to the AR/VR digital survey generator 110, and as shown in FIG. 1, the digital AR/VR survey system 100 can also include the digital survey indicator facility 112. The digital survey indicator facility 112 can generate, create, and/or provide a digital survey indicator. In particular, in one or more embodiments, the digital survey indicator facility 112 generates a digital survey indicator and (utilizing the augmented reality engine 104 and/or the virtual environment facility 106) provides the digital survey indicator for display via an AR/VR device.

The digital survey indicator facility 112 can generate a digital survey indicator such that the digital survey indicator corresponds to an object. For instance, the digital survey indicator facility 112 can generate a digital survey indicator and (utilizing the augmented reality engine 104 and/or the virtual environment facility 106) provide the digital survey indicator for display via an AR/VR device such that the digital survey indicator is within a proximity of a virtual object, an augmented reality object, and/or a real-world environmental component.

In addition, the digital survey indicator facility 112 can generate a digital survey indicator such that the digital survey indicator corresponds to a particular location. For instance, the digital survey indicator facility 112 can generate a digital survey indicator and provide the digital survey indicator for display at a particular location in a virtual environment or at a particular location in the real world.

The digital survey indicator facility 112 can also generate a digital survey indicator at a particular time (e.g., based on satisfaction of one or more triggering events). For instance, the digital survey indicator facility 112 can provide a digital survey indicator at a particular time based on user interaction with a real-world component, augmented reality element, and/or virtual element; based on a time threshold (e.g., a time after a particular event occurs); based on a virtual location (e.g., when a user is at a particular location or virtual location); and/or based on a user's activity history (e.g., prior user interactions). For instance, the AR/VR user interaction analyzer 108 can determine that a user is engaged in a particular activity, is at a particular location, and/or is interacting with a particular object at a particular moment in time. In response, the digital survey indicator facility 112 can generate and provide the digital survey indicator based on the particular moment in time.

As shown in FIG. 1, the digital AR/VR survey system may also include the AR/VR digital survey provider 114. The AR/VR digital survey provider 114 can administer and/or provide one or more digital surveys. In particular, the AR/VR digital survey provider 114 can administer a digital survey via an AR/VR device. Thus, for instance, the AR/VR digital survey provider 114 can provide survey questions utilizing augmented reality elements via an augmented reality device. Similarly, the AR/VR digital survey provider 114 can provide survey questions utilizing virtual elements via a virtual reality device.

For example, the AR/VR digital survey provider 114 can provide a digital survey in relation to a virtual object, an augmented reality element, and/or a real-world environmental component. For instance, the AR/VR digital survey provider 114 can provide a digital survey regarding a television show by providing a survey question as an augmented reality element for display (e.g., via the augmented reality engine 104) in close proximity to a television showing the television show. Similarly, the AR/VR digital survey provider 114 can provide a digital survey regarding a virtual object in close proximity to the virtual object in a virtual environment.

Moreover, the AR/VR digital survey provider 114 can also generate a dedicated survey environment. For example, in a virtual environment, the AR/VR digital survey provider 114 can generate a dedicated survey room for providing a digital survey to a respondent. Additional details relating to a dedicated survey room with be discussed further below.

Similar to the digital survey indicator facility 112, the AR/VR digital survey provider 114 can also provide a digital survey in relation to a particular object, in relation to a particular location, or at a particular time. For instance, the digital survey indicator facility 112 can generate a digital survey such that a survey question is within a proximity of a particular object (e.g., a survey regarding a pair of shoes hovers above the pair of shoes or an audio survey is provided such that it sounds like audible questions are emanating from the direction of the pair of shoes). Similarly, the digital survey indicator facility 112 can generate a digital survey at a particular location in the virtual world or real world (e.g., a survey regarding renovations to a downtown area are provided as augmented reality elements within the downtown area). In addition, the digital survey indicator facility 112 can select a time to present a digital survey based on user interaction with a real-world component, augmented reality element, or virtual element (e.g., based on one or more triggering events); based on a time threshold (e.g., a time after a particular event occurs); based on a virtual location (e.g., when a user is at a particular location or virtual location); and/or based on a user's activity history (e.g., prior user interactions).

The digital survey indicator facility 112 can also select a digital survey based on user interactions. For example, as discussed, the AR/VR user interaction analyzer 108 can monitor user interactions with an AR/VR device (e.g., and store the user interactions in a user profile). The digital survey indicator facility 112 can utilize the user interactions (e.g., the user profile) to select a digital survey to provide. To illustrate, the digital survey indicator facility 112 can select a digital survey for a respondent regarding diapers based on monitored user interactions with a new baby.

In addition, as shown in FIG. 1, the digital AR/VR survey system 100 can also include the response data engine 116. The response data engine 116 can receive, identify, obtain, determine, and analyze response data via an AR/VR device. In particular, the response data engine 116 can analyze user interactions and/or user input (e.g., via the user input manager 102) to determine responses to one or more survey questions.

The response data engine 116 can identify response data from any user input, user interaction, or environmental data. For example, the response data engine 116 can identify response data from movement of a user (e.g., a gesture, a nod of the head, a thumbs up); a direction of gaze (e.g., a direction of the head or a direction of the eyes); a movement corresponding to the user within a virtual environment (e.g., moving an avatar to a virtual location); an auditory utterance by the user; selection of a button on a controller; biometric data, and/or any variety of identified metrics.

As illustrated in FIG. 1, the digital AR/VR survey system 100 may also include the reporting manager 118. The reporting manager 118 can provide, distribute, create, report and/or generate result reports from a digital survey. In particular, the reporting manager 118 can collect and organize results from a digital survey and provide the results via an AR/VR device. Specifically, the reporting manager 118 can analyze response data to generate survey results and then provide the survey results for display via an AR/VR device, or via another computing device.

As used herein, the term "survey results" refers to data reflecting response data from a digital survey. In particular, collecting, analyzing, and organizing survey results includes generating summaries, tables, charts, analysis, or statistics based on response data. For example, the reporting manager 118 can identify a plurality of ratings from individuals via an AR/VR device regarding a product (e.g., a rating from 1 to 10 regarding a product) and generate survey results comprising the average rating for the product, the range of ratings, or the standard deviation of ratings.

In addition to reporting survey results from response data, the reporting manager 118 can also provide survey results via an AR/VR device. For example, the reporting manager 118 can provide results from a digital survey as an augmented reality element. To illustrate, in a digital survey regarding one or more products, the reporting manager 118 can generate (e.g., via the augmented reality engine 104) augmented reality elements that indicate response data regarding each corresponding product. More specifically, the reporting manager 118 can generate an augmented reality element that identifies survey results for a product that is positioned in proximity to a product via an augmented reality device.

Similarly, the reporting manager 118 can provide results from a digital survey within a virtual environment. For example, for a survey directed to a plurality of products, the reporting manager 118 can provide a virtual environment that displays virtual representations of the plurality of products together with virtual elements displaying survey results.

As shown in FIG. 1, the digital AR/VR survey system 100 may also include the storage manager 120. The storage manager 120 maintains data for the digital AR/VR survey system 100. The storage manager 120 maintains data as necessary to perform the functions of the digital AR/VR survey system 100. In particular, as shown, the storage manager 120 can maintain user profiles 122, digital surveys 124, response data 126, virtual environments 128, and augmented reality elements 130.

As just mentioned, the storage manager 120 can include user profiles 122. User profiles 122 can comprise information regarding users of one or more AR/VR devices. User profiles 122 can include settings, preferences, payment information, location information, demographic information, or other personal information of a user. User profiles 122 can also include user interactions in relation to one or more AR/VR devices. For example, the user profiles 122 can comprise data obtained (e.g., monitored) by the user input manager 102 and/or the AR/VR user interaction analyzer 108. Accordingly, the digital AR/VR survey system 100 can monitor and track conduct, activities, purchases, locations visited, or other events of users of AR/VR devices and record such information in the user profiles 122.

Each of the components 102-130 of the digital AR/VR survey system 100 may be in communication with one another using any suitable communication technologies. It will be recognized that although components 102-130 of the digital AR/VR survey system 100 are shown to be separate in FIG. 1, any of components 102-130 and their corresponding elements may be combined into fewer components, such as into a single facility or module, divided into more components, or configured into different components as may serve a particular embodiment. For example, in one or more embodiments, the user input manager 102, the augmented reality engine 104, the virtual environment facility 106, the virtual environments 128, and/or the augmented reality elements 130 are implemented as part of a separate virtual reality and/or augmented reality system (e.g., on a remote survey of a third party) that interacts with the other components of the digital AR/VR survey system 100.

Figure 2:
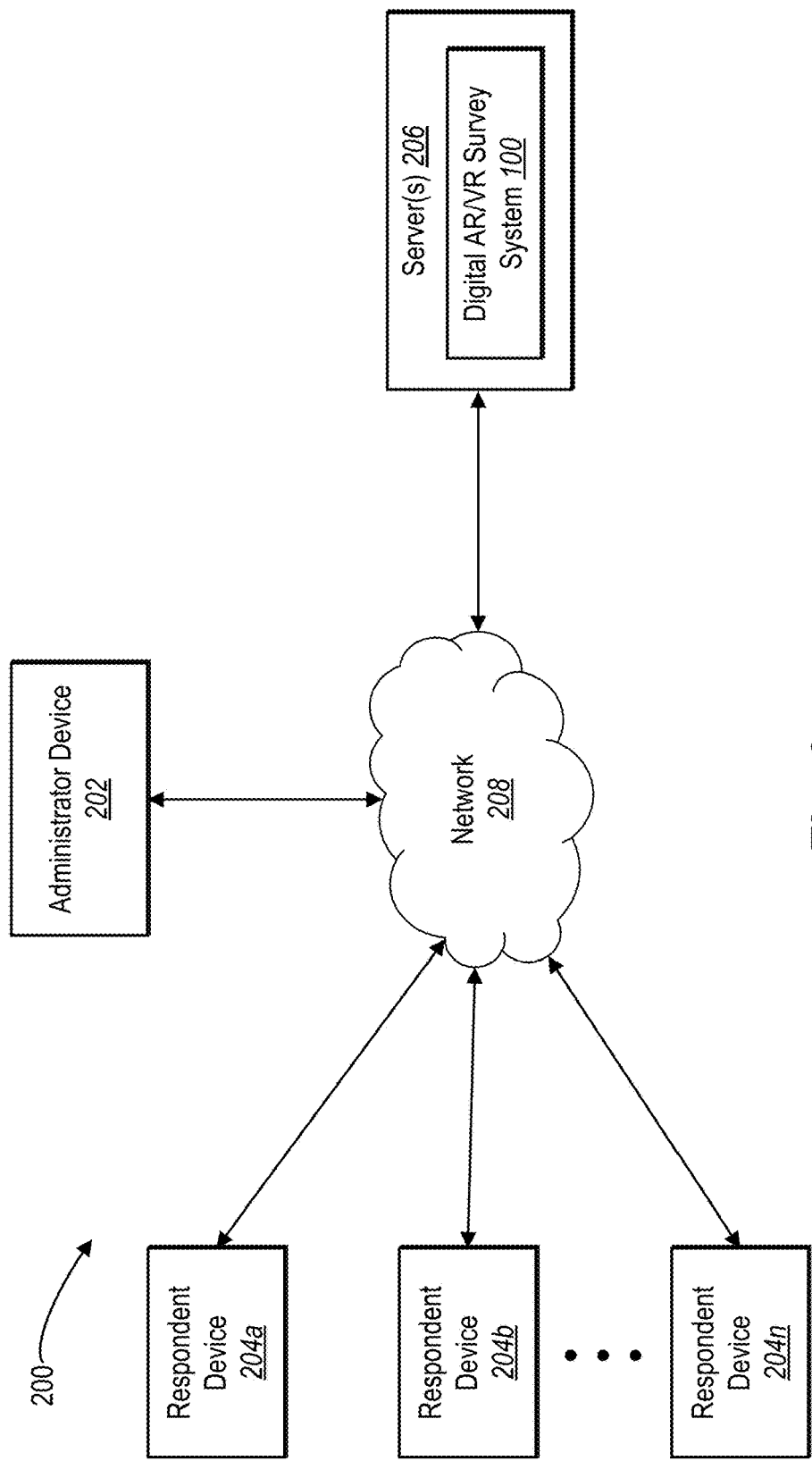
FIG. 2 illustrates a schematic diagram of a network environment in which the digital AR/VR survey system may be implemented in accordance with one or more embodiments.

Indeed, the digital AR/VR survey system 100 may be implemented in a variety of environments utilizing a variety of computing devices. For instance, FIG. 2 illustrates a schematic diagram of an exemplary environment 200 in which the digital AR/VR survey system 100 may be implemented. In particular, FIG. 2 illustrates that the environment 200 may include an administrator device 202, respondent devices 204a-204n, server(s) 206, and a network 208.

As illustrated, various components of the environment 200 can communicate via the network 208. For instance, the administrator device 202 and the respondent devices 204a-204n can access the server(s) 206 hosting the digital AR/VR survey system 100 via the network 208. The network 208 may be any suitable network over which the computing devices can communicate. Example networks are discussed in greater detail below with regard to FIG. 9.

As shown in FIG. 2, the environment 200 can include the administrator device 202 and the respondent devices 204a-204n. The administrator device 202 and the respondent devices 204a-204n may each be a type of computing device. One type of computing device includes a mobile device (e.g., a cell phone, a smartphone, a PDA, a tablet, a laptop, a watch, a wearable device, etc.). Another type of computing device includes a non-mobile device (e.g., a desktop or server; or another type of client device). Additional details with respect to computing devices are discussed below with respect to FIG. 9.

The administrator device 202 and the respondent devices 204a-204n may also comprise AR/VR devices. For instance, the respondent device 204a can comprise an augmented reality device, the respondent device 204b can comprise a virtual reality device, and the administrator device 202 can comprise both an augmented reality device and a virtual reality device.

For example, the respondent device 204a can comprise augmented reality glasses worn by a respondent that overlays augmented reality elements onto a view of the real world. In addition, the respondent device 204a can comprise an augmented reality device that detects user interactions and user input (e.g., provides user interactions and user input to the user input manager 102). Moreover, the respondent device 204a can provide an augmented reality element (e.g., from the augmented reality engine 104) as an overlay to a real-world view and detect user interaction with the augmented reality element.

Similarly, as mentioned above, the respondent device 204b can comprise a virtual reality device. In particular, the respondent device 204b can comprise a virtual reality headset worn by a respondent that generates (e.g., via the virtual environment facility 106) a three-dimensional representation of a virtual environment. Moreover, the respondent device 204b can track movements of a respondent to modify a three-dimensional representation (e.g., via the virtual environment facility 106) based on the movements of the respondent. To illustrate, the respondent device 204b can detect changes in orientation, position, and/or tilt of a respondent and modify the three-dimensional representation to simulate equivalent changes in orientation, position, and/or tilt within the virtual environment. Thus, for example, the respondent device 204b can detect that a respondent turns horizontally and adjust a three-dimensional representation to simulate the respondent turning horizontally within the virtual environment.

In addition to detecting and simulating movement, the respondent device 204b can also detect gestures, selections, and other user input (e.g., and provide the user input to the user input manager 102). For example, the respondent device 204b can utilize optical sensors and/or wearable devices to detect gestures, such as pointing, raising arms, or doing a thumbs up. Similarly, the respondent device 204b can detect user interactions with an object in a virtual environment.

Moreover, as shown in FIG. 2, the environment 200 can also include the server(s) 206. The server(s) 206 may generate, store, receive, and transmit any type of data, including user profiles 122, digital surveys 124, response data 126, virtual environments 128, and/or augmented reality elements 130. For example, the server(s) 206 may transmit data to a client device, such as the respondent devices 204a-204n and/or the administrator device 202. The server(s) 206 can also transmit electronic messages between one or more users of the environment 100. In one example embodiment, the server(s) 206 comprise content servers. The server(s) 206 can also comprise a communication server or a web-hosting server. As illustrated, in one or more embodiments, the server(s) 206 may host digital AR/VR survey system 100. Additional details regarding the server(s) 206 will be discussed below with respect to FIG. 9.

In combination, the components of the environment 200 can interact to create, administer, and/or report digital surveys. For example, in one or more embodiments, the administrator device 202 transmits a request to create a digital survey to the server(s) 206. In response, the server(s) 206 (via the AR/VR digital survey generator 110) can correspond with the administrator device 202 to generate a digital survey (e.g., by presenting a virtual reality or augmented reality interview at the administrator device 202).

Furthermore, the server(s) 206 (e.g., via the user input manager 102 and the AR/VR user interaction analyzer 108) can monitor user interactions with the respondent devices 204a-204n. For instance, based on user interactions at the respondent devices 204a-204n, the server(s) 206 can identify and provide (e.g., via the digital survey indicator facility 112) one or more digital survey indicators for display by the respondent devices 204a-204n.

The server(s) 206 can also receive response data from the respondent devices 204a-204n (e.g., via the response data engine 116). Moreover, based on the response data, the server(s) 206 can report (e.g., via the reporting manager 118) survey results to the administrator device 202. For example, server(s) 206 provide the administrator device 202 with survey results in a virtual environment and/or via augmented reality elements.

The server(s) 206 can also operate to allow users of the respondent devices 204a-204n to interact. For example, in relation to a virtual environment, the server(s) 206 can receive user input from the respondent devices 204a-204n, determine how the user input impacts the virtual environment, and then provide a modified virtual environment. Similarly, in relation to an augmented reality device, the server(s) 206 can receive user input from the respondent devices 204a-204n and provide augmented reality elements for display that reflects the user input from the respondent devices 204a-204n.

As illustrated by the previous example, various components of the digital AR/VR survey system 100 may be implemented by various portions of the environment 200. For example, as shown in FIG. 2, the digital AR/VR survey system 100 may be implemented by the server(s) 206. However, in other embodiments, the digital AR/VR survey system 100 may be implemented via the administrator device 202, the respondent devices 204a-204n, the server(s) 206, and/or the network 208.

Moreover, in one or more embodiments, the digital AR/VR survey system 100 may be implemented on the respondent device 204a. For example, the respondent device 204a can download instructions for executing the digital AR/VR survey system 100 from the server(s) 206 such that the respondent device 204a can conduct digital surveys (e.g., even when the respondent device 204a is offline, and not connected to the server(s) 206 and/or the network 208). To illustrate, components of the digital AR/VR survey system 100 implemented at the respondent device 204a can identify user interactions from the respondent device 204a, determine survey questions to provide to the user of the respondent device 204a, provide digital survey indicators to the respondent device 204a, provide survey questions to the respondent device 204a, and receive response data collect at the respondent device 204a.

Although FIG. 2 illustrates a particular arrangement of the administrator device 202, the respondent devices 204a-204n, the server(s) 206, and the network 208, various additional arrangements are possible. For example, while FIG. 2 illustrates multiple separate client devices 204a-204n communicating with the server(s) 206 via the network 208, in one or more embodiments a single client device may communicate directly with the server(s) 206, bypassing the network 208. Further, while only one administrator device 202 and three respondent devices 204a-204n are illustrated, the environment 200 can include any number of administrator devices and respondent devices (and corresponding users).

In addition, although the environment 200 of FIG. 2 is depicted as having various components, the environment 200 may have additional or alternative components. For example, the digital AR/VR survey system 100 can be implemented on a single computing device. In particular, the digital AR/VR survey system 100 may be implemented in whole by the respondent device 204n or the server(s) 206. Alternatively, the digital AR/VR survey system 100 may be implemented across multiple devices or components.

In addition, as discussed above, portions of the digital AR/VR survey system 100 may be implemented by a third-party augmented reality and/or virtual reality system. For example, the environment 200 may implement the digital AR/VR survey system 100 via a first server and an augmented reality system and/or virtual reality system via a second separate server.

Figure 3A:
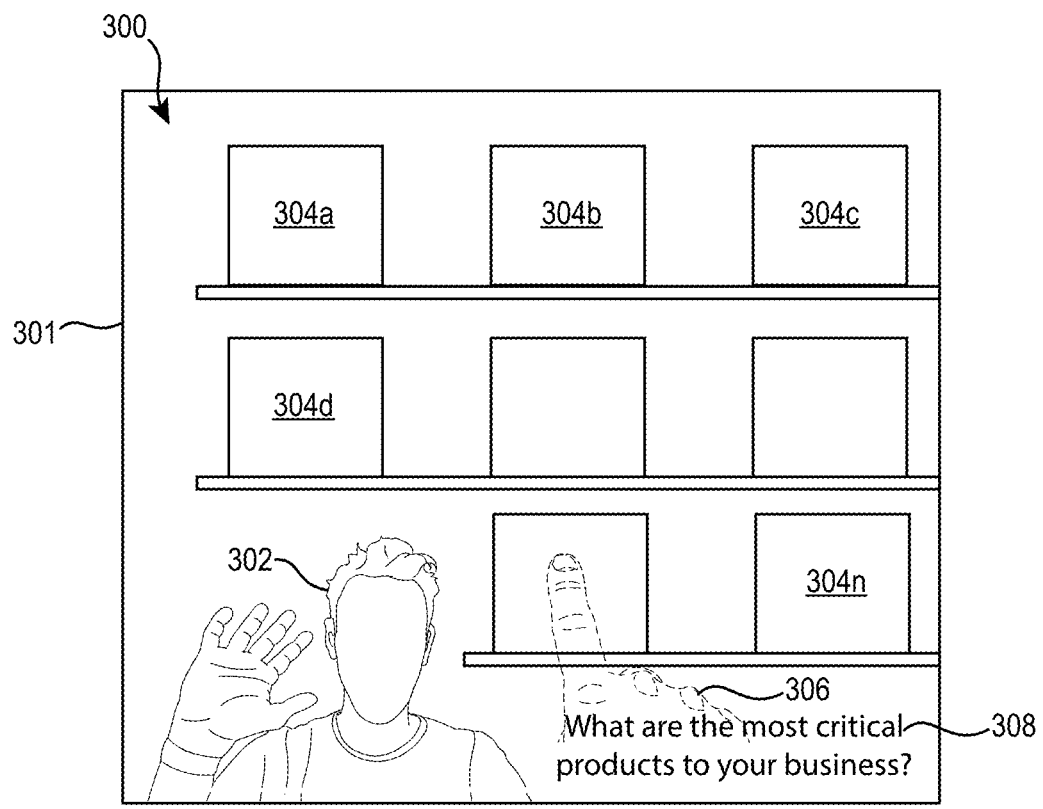
FIG. 3A illustrates representations of creating a digital survey in relation to a virtual reality and/or augmented reality device in accordance with one or more embodiments.
Figure 3B:
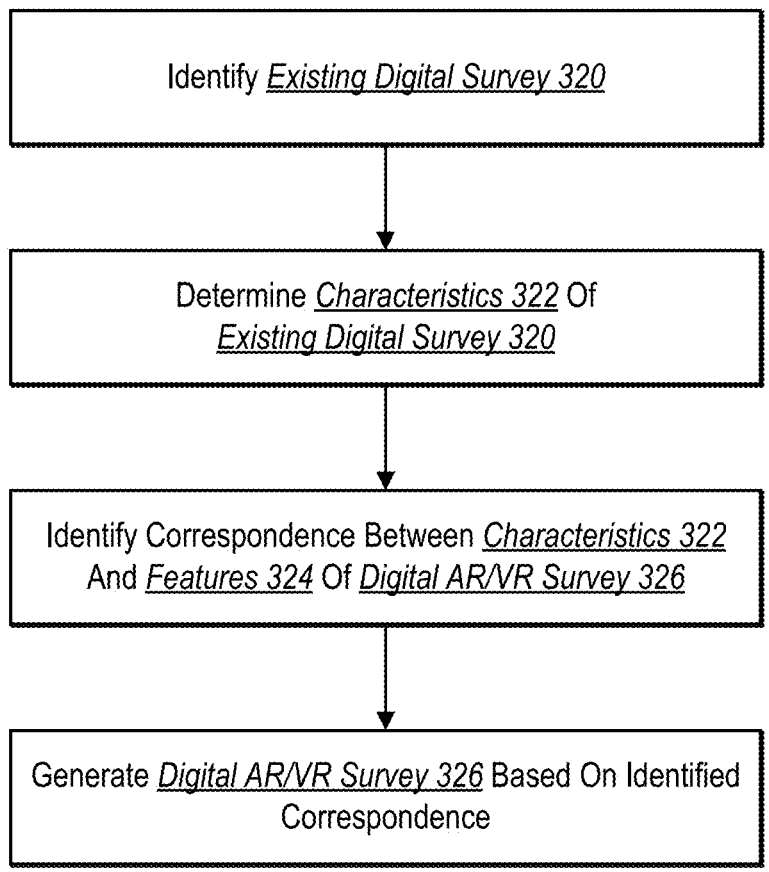
FIG. 3B illustrates a flowchart of a series of acts in a method of creating a digital survey using virtual reality and/or augmented reality device in accordance with one or more embodiments

Turning now to FIGS. 3A-3B, additional detail will be provided regarding creating a digital survey in accordance with one or more embodiments. Indeed, as discussed above, in one or more embodiments the digital AR/VR survey system 100 can generate a digital survey in a variety of ways, including, based on user interaction by an administrator utilizing an AR/VR device, by converting existing digital surveys into digital surveys for utilization in AR/VR devices, or based on user interaction provided by respondents via AR/VR devices.

For example, FIG. 3A illustrates a representation of creating a digital survey based on administrator user interaction with an AR/VR device, in accordance with one or more embodiments. In particular, FIG. 3A illustrates a virtual environment 300 provided via a virtual reality device 301 and the digital AR/VR survey system 100. As shown, the virtual environment 300 includes a virtual representation of an individual 302 (i.e., an "avatar 302"). Moreover, the avatar 302 provides a guided, interactive interview for creating a digital survey. Moreover, the virtual environment 300 provides an administrator with an immersive, three-dimensional experience for providing information necessary for creating a digital survey.

In particular, as shown in FIG. 3A, the avatar 302 asks a question 308 in relation to one or more virtual elements provided for display in the virtual environment 300. Specifically, the avatar 302 ask the question 308, "What are the most critical products to your business," while displaying virtual products 304a-304n in the virtual environment 300.

As illustrated in FIG. 3A, the administrator makes a gesture with a hand 306 to select a one or more products from the virtual products 304a-304n in response to the question 308. The digital AR/VR survey system 100 can receive the administrator's selections and then continue to assist the administrator in generating a digital survey based on the response. For example, the digital AR/VR survey system 100 can then ask for additional information regarding each of the selected products to build a digital survey.

Indeed, although FIG. 3A illustrates the question 308 and the virtual products 304a-304n, it will be appreciated that the digital AR/VR survey system 100 can provide a variety of questions and a variety of virtual elements to assist in building a digital survey for an administrator. For example, in addition to products, the digital AR/VR survey system 100 can ask questions regarding types of surveys desired, customer information, sales information, product distribution channels, advertising distribution channels, or branding. Similarly, the digital AR/VR survey system 100 can provide virtual elements portraying types of surveys, customer information, sales figures, possible product distribution channels, advertising distribution channels, or product brands. In this manner, the digital AR/VR survey system 100 enables administrators to engage in an interactive, virtual environment for providing information necessary for generating a digital survey.

For instance, based on an administrator's responses to the question 308 regarding products (and/or other follow on questions regarding an administrator's business or survey goals), the digital AR/VR survey system 100 can suggest one or more topics to target via a digital survey. For example, the digital AR/VR survey system 100 can suggest, via the virtual reality device 301 that an administrator target a particular product, a particular business category (e.g., customer service), or a particular area of concern (e.g., employee moral). To illustrate, the digital AR/VR survey system 100 can provide virtual elements directed to suggested topics for display via an AR/VR device and receive responses via the AR/VR device in relation to the suggested topics (e.g., receive selections of the suggested topics).

In this manner, the digital AR/VR survey system 100 can interact with an administrator to generate a digital survey. Indeed, as mentioned above, the digital AR/VR survey system 100 can utilize this approach to define a variety of digital survey features based on user input from an administrator. For example, the digital AR/VR survey system 100 can suggest and identify proposed survey questions. Similarly, the digital AR/VR survey system 100 can identify characteristics of respondents to target with survey questions, timing (e.g., triggering events) for presenting a digital survey and/or digital survey indicators to a respondent, location of a digital survey and/or digital survey indicators, and/or distribution channels for the digital survey. The digital AR/VR survey system 100 can also generate a decision-tree for providing particular survey questions based on user interactions or responses provided by a respondent in response to a digital survey (e.g., if a user responds to a first question with a first user interaction, the decision-tree can indicate a second question to provide).

As shown in FIG. 3A, the digital AR/VR survey system 100 can generate one or more questions to provide an administrator in generating a digital survey. In one or more embodiments, the digital AR/VR survey system 100 utilizes a database of questions to assist in building a digital survey via an AR/VR device. In particular, the digital AR/VR survey system can utilize a database of questions and select questions based on a response from an administrator trying to build a digital survey. For example, the digital AR/VR survey system 100 can utilize a database of questions organized in a decision-tree. The digital AR/VR survey system 100 can utilize the database of questions organized in a decision-tree to provide particular questions based on responses provided by an administrator.

Thus, in one or more embodiments, the avatar 302 and the question 308 are provided automatically by the digital AR/VR survey system 100 (e.g., without user input by an interviewer). The avatar 302 can automatically move, talk, and otherwise interact with the administrator via the virtual environment to provide a more natural interface for generating a digital survey.

In one or more embodiments, however, the avatar 302 is controlled based on contemporaneous user input of another person. For example, an interviewer in a remote location can utilize a virtual reality device and interact with the administrator via the virtual environment 300. Thus, in one or more embodiments, the interviewer can control the avatar 302, including the its movements, questions, appearance, and interaction with the virtual environment 300.

It will be appreciated that although the embodiment of FIG. 3A illustrates a particular gesture (e.g., pointing with the hand 306) for providing a response via the virtual reality device 301, the digital AR/VR survey system 100 can utilize any movement, gesture, or other user input to detect a response. For example, in addition to a gesture with a finger, the digital AR/VR survey system 100 can receive user input indicating where the administrator is looking (e.g., head movement or eye movement), a movement of the user within the virtual environment, or the administrator interacting with (e.g., grabbing or touching) a virtual object in the virtual environment 300.

Moreover, although FIG. 3A illustrates the question 308 as a virtual element comprising written text, it will be appreciated that the question 308 can also be provided in a different form. For example, the digital AR/VR survey system 100 can provide the question 308 as audio played through the virtual reality device 301. Similarly, the digital AR/VR survey system 100 can receive a response via an auditory response of the administrator via the virtual reality device 301.

Furthermore, although FIG. 3A illustrates a representation of a virtual environment 300 provided for display via the virtual reality device 301, it will be appreciated that the digital AR/VR survey system 100 can also generate digital surveys based on user input from administrators via an augmented reality device. Indeed, rather than a virtual environment, the digital AR/VR survey system 100 can conduct an interview via an augmented reality device with augmented reality elements overlaid on a view of the real world.

To illustrate, the digital AR/VR survey system 100 can provide the avatar 302 as an augmented reality element via an augmented reality device. The avatar 302 can ask questions and/or provide instructions via the augmented reality device. For example, the digital AR/VR survey system 100 can provide augmented reality elements comprising text questions (e.g., overlay text onto a view of the real world) or provide audio questions via the augmented reality device.

Moreover, the digital AR/VR survey system 100 can detect user interaction with augmented reality elements and/or real-world environmental components. For example, in utilizing an augmented reality device, the products 304a-304n can comprise real-world environmental components (e.g., real products on real shelves of a grocery store) or augmented reality elements (e.g., digital elements overlain on a view of the real world). The digital AR/VR survey system 100 can receive user interactions with real-world environment components and/or augmented reality elements and conduct an interview for generating a digital survey based on the received user interactions.

In generating a digital survey, the digital AR/VR survey system 100 can also provide a preview of a digital survey to an administrator. For example, after completing an interview, the digital AR/VR survey system 100 can generate a digital survey that can be administered via AR/VR devices. The digital AR/VR survey system 100 can provide a preview of the digital survey to the administrator so that the administrator can experience the digital survey via an AR/VR device before it is provided to other respondents.

In providing a preview of a digital survey via an AR/VR device to an administrator, the digital AR/VR survey system 100 can obtain additional feedback and response data from an administrator. For example, the digital AR/VR survey system 100 can provide a preview of a digital survey via an AR/VR device to an administrator and ask the administrator for impressions, questions, and/or suggested modifications during the digital survey. In this manner, the digital AR/VR survey system 100 can continue to modify a digital survey via an AR/VR device using a survey preview tool for administrators.

Furthermore, as mentioned above, in addition to generating digital surveys based on user input via an AR/VR device by an administrator, the digital AR/VR survey system 100 can also convert an existing digital survey into a digital survey for utilization by AR/VR devices. For purposes of the discussion with reference to FIG. 3B, the term "digital AR/VR survey" is utilized herein to refer to digital surveys formatted to operate in conjunction with AR/VR devices.

For example, in some circumstances, administrators may have created digital surveys for other distribution channels or environments, such as e-mail, websites, messaging systems (e.g., text message or instant message), or point of sale systems (e.g., surveys or invitations to participate in a survey on a receipt, coupon, or advertisement). The digital AR/VR survey system 100 can translate such existing digital surveys into digital AR/VR surveys.

In particular, in one or more embodiments, the digital AR/VR survey system 100 detects characteristics of an existing digital survey and utilizes the characteristics of the existing digital survey to generate a digital survey for an AR/VR device. For instance, the digital AR/VR survey system 100 can detect characteristics regarding an existing survey, determine a correspondence between the characteristics of the existing survey and needed features of a digital AR/VR survey, and then create a new digital AR/VR survey based on the determined correspondence.

For example, FIG. 3B illustrates a representation of a sequence diagram for converting one or more existing digital surveys into a digital survey for utilization via an AR/VR device. In particular, as shown in FIG. 3B, the digital AR/VR survey system 100 can identify an existing digital survey 320. To illustrate, the digital AR/VR survey system 100 can receive user input of an administrator identifying the existing digital survey 320.

As shown in FIG. 3B, the digital AR/VR survey system 100 can also determine characteristics 322 of the existing digital survey 320. For example, the existing digital survey 320 can include characteristics defining survey questions, triggering events for administering the survey questions, timing for providing the survey questions, and/or target responders for the survey questions. The digital AR/VR survey system 100 can detect such characteristics, as illustrated, and utilize the characteristics to generate a digital AR/VR survey.

Specifically, as shown, the digital AR/VR survey system 100 can identify a correspondence between the characteristics 322 of the existing digital survey 320 and needed features 324 of a digital AR/VR survey 326. To illustrate, the digital AR/VR survey system 100 can detect that the existing digital survey 320 comprises a plurality of questions, targeted to visitors of a website that are males ages 18-25 from the United States between the hours of 4-6 p.m. The digital AR/VR survey system 100 can identify needed features of the digital AR/VR survey 326 that correspond to the characteristics of the existing survey. For example, the digital AR/VR survey system 100 can determine that the digital AR/VR survey 326 lacks survey questions, timing for delivering the survey questions, and target respondents. Accordingly, the digital AR/VR survey system 100 can determine a correspondence between the survey questions of the existing digital survey 320 and the needed survey questions of the digital AR/VR survey 326; determine a correspondence between the targeted website visitors of the existing digital survey 320 and the needed target respondents of the digital AR/VR survey 326; and determine a correspondence between the time of administering the survey questions of the existing digital survey 320 via the website and the needed time for presenting survey questions of the digital AR/VR survey 326.

As shown, the digital AR/VR survey system 100 can also generate the digital AR/VR survey 326 based on the identified correspondence. For example, continuing the previous example, the digital AR/VR survey system 100 can generate the digital AR/VR survey 326 based on the website questions from the existing digital survey 320. Moreover, the digital AR/VR survey system 100 can generate the digital AR/VR survey 326 to target users of AR/VR devices that are 18-25 years old in the United States. For example, based on the existing digital survey 320 targeting web site visitors that are 18-25 years old in the United States, the digital AR/VR survey system 100 can provide digital surveys to AR/VR devices upon detecting an activity likely to be conducted by users having those characteristics. For example, the digital AR/VR survey system 100 can provide the digital AR/VR survey 326 in a particular virtual location commonly visited by users that are 18-25 years old in the United States. Similarly, the digital AR/VR survey system 100 can provide the digital AR/VR survey 326 via an augmented reality device when a user visits a real location visited by users of having those characteristics.

Moreover, the digital AR/VR survey system 100 can also translate individual parts of an existing digital survey from an existing format to a format that can be utilized by AR/VR devices. For example, although an existing digital survey may be formatted to provide survey questions in HTML, the digital AR/VR survey system 100 can convert the HTML text to an appropriate formatting for an AR/VR device (e.g., formatting of a virtual element and/or an augmented reality element).

It will be appreciated that the digital AR/VR survey system 100 can generate a variety of features of a digital AR/VR survey based on a variety of characteristics of existing digital surveys. For example, the digital AR/VR survey system 100 can generate a digital survey indicator based on characteristics of an existing survey. To illustrate, the digital AR/VR survey system 100 can identify a brand, logo, or mark from an existing survey and automatically utilize the identified brand, logo, or mark as a digital survey indicator in providing a digital AR/VR survey.

Similarly, the digital AR/VR system 100 can identify a real-world environmental component, augmented reality element, and/or triggering event corresponding to a digital survey indicator (or digital survey) based on characteristics of an existing survey. For example, the digital AR/VR system 100 can detect one or more key words from an existing digital survey (e.g., a plurality of questions corresponding to a pair of shoes). The digital AR/VR system 100 can automatically identify a triggering event based on the key words (e.g., when a user interacts with shoes, provide a digital survey). Moreover, the digital AR/VR system 100 can identify a real-world environmental component with which to provide the digital survey (e.g., provide the digital survey such that it hovers in relation to the shoes).

Moreover, the digital AR/VR system 100 can determine survey questions and/or survey answer options to provide in a digital AR/VR survey based on existing surveys. For example, the digital AR/VR system 100 can utilize a survey question and answer options administered as part of a digital survey on a web site to generate a corresponding question and answer options in a digital AR/VR survey.

The digital AR/VR system 100 can also modify characteristics of an existing digital survey in generating a digital AR/VR survey. For example, the digital AR/VR system 100 can identify a survey question and multiple choice answer options in an existing digital survey and modify the survey question and multiple choice answer options for implementation in a digital AR/VR survey. To illustrate, the digital AR/VR system 100 can generate a plurality of survey rooms with survey doors corresponding to the multiple choice answer options in the existing digital survey.

As mentioned above, the digital AR/VR survey system 100 can also utilize more than one existing digital survey to generate digital AR/VR surveys. For example, the digital AR/VR survey system 100 can detect characteristics from a plurality of different existing surveys (e.g., products that trigger a point of sale survey, purchases that target an e-mail survey, and/or websites that target a website survey) and utilize the detected characteristics to generate a digital AR/VR survey (e.g., a digital AR/VR survey that is triggered when a user interacts with the products, makes similar purchases, and/or visits virtual locations similar to the websites).

As just described, in generating a digital survey, the digital AR/VR survey system 100 can identify a particular panel of targeted respondents. It will be appreciated that the digital AR/VR survey system 100 can define targeted respondents based on a variety of characteristics, user interactions, and/or metrics. For example, as described above, the digital AR/VR survey system 100 can target individuals based on demographic information (e.g., age, gender, location). In addition, the digital AR/VR survey system 100 can define target respondents based on prior user interactions (e.g., visiting particular locations, viewing certain objects, engaging in particular activities). Moreover, the digital AR/VR survey system 100 can gather and analyze metrics in relation to frequency, duration, and/or location of user interactions in identifying target respondents. Thus, the digital AR/VR survey system 100 enables administrators to identify uniquely specific target respondents to obtain the most pertinent responses.

To illustrate, a company may be concerned that an advertising campaign directed to teenagers is becoming stale to consumers that have already utilized the company's products. By monitoring user interactions via AR/VR devices, the digital AR/VR survey system 100 can enable the company to target respondents utilizing AR/VR devices that are teenagers who have already seen ads from the advertising campaign and have already utilized the company's products a minimum number of times. In this manner, the digital AR/VR survey system 100 can enable uniquely tailored targeted surveying via AR/VR devices.

Moreover, as discussed previously, the digital AR/VR survey system 100 can also generate digital AR/VR surveys based on respondent user interaction via one or more AR/VR device. For instance, the digital AR/VR survey system 100 can detect user interactions by respondents with virtual environments, augmented reality elements, or real-world environmental components and generate a digital survey based on the user interactions.

For example, the digital AR/VR survey system 100 can detect via augmented reality devices that users driving a particular brand of automobile rarely utilize a unique acceleration feature operable by selection of a button on the dashboard. Based on this user interaction (or lack of user interaction), the digital AR/VR survey system 100 can generate a digital survey that explores why users rarely utilize the acceleration feature and whether users that do utilize the acceleration feature have a more favorable impression of the automobile.

Similarly, the digital AR/VR survey system 100 can detect via an augmented reality device that users who visit a particular virtual location tend to purchase a company's products. In response, the digital AR/VR survey system 100 can generate a digital survey directed to a connection between the particular virtual location and the company's products.

In one or more embodiments, the digital AR/VR survey system 100 generates digital surveys by monitoring and analyzing user interactions of AR/VR devices and then determining survey questions based on the analysis. In particular, the digital AR/VR survey system 100 can analyze these user interactions to determine statistical correlations, outliers, and/or anomalies. For example, the digital AR/VR survey system can focus on statistical outliners corresponding to a particular administrator's products. Upon identifying statistical correlations, outliers and/or anomalies, the digital AR/VR survey system 100 can generate digital surveys corresponding to the correlations, outliners, and/or anomalies.

To illustrate, consider a company that seeks to improve utilization of a particular product feature. The digital AR/VR survey system 100 can monitor user interactions via an augmented reality device and determine a correlation between users that visit a particular location and utilization of the particular product feature. The digital AR/VR survey system 100 can then generate digital survey questions directed to the product feature and the location (e.g., "would you use this feature more frequently if you were in this location and why?").

In addition to generating digital surveys in relation to AR/VR devices, as discussed previously, the digital AR/VR survey system 100 can also provide a digital survey via an augmented reality device. For instance, the digital AR/VR survey system 100 can detect user interactions via an augmented reality device and provide a digital survey indicator (and/or digital survey) in response to the detected user interactions. FIGS. 4A-4G illustrate utilizing an augmented reality device to provide a digital survey in accordance with one or more embodiments.

Figure 4A:
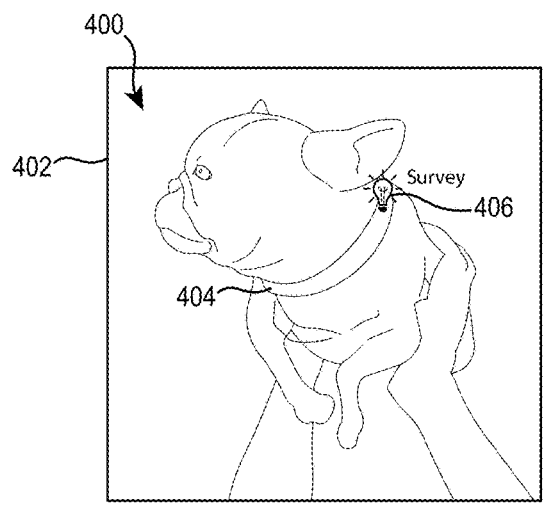
FIGS. 4A-4H illustrate representations of providing a digital survey in relation to an augmented reality device in accordance with one or more embodiments.

Specifically, FIG. 4A illustrates a view 400 of the real world environment provided via an augmented reality device 402. In particular, the view 400 comprises a dog (i.e., a real dog) having a collar 404 (i.e., a real collar). Moreover, FIG. 4A illustrates that the digital AR/VR survey system 100 provides for display via the augmented reality device 402 a digital survey indicator 406 as an augmented reality element. For instance, the augmented reality device 402 of FIG. 4A comprises augmented reality glasses that allow a view of the real world to pass through the augmented reality glasses while also providing augmented reality elements as an overlay. Accordingly, the view 400 comprises light rays passing through the augmented reality glasses in addition to digital augmented reality elements displayed via the augmented reality glasses. It will be appreciated, however, that the augmented reality device 402 can comprise any augmented reality device described herein.

As discussed previously, the digital AR/VR survey system 100 can detect user interaction with one or more real-world components. Moreover, based on the user interaction, the digital AR/VR survey system 100 can present for display a digital survey indicator as an augmented reality element via an augmented reality device. For example, the digital AR/VR survey system 100 can maintain a database of triggering events corresponding to a particular digital survey indicator. Specifically, as part of generating a digital survey, the digital AR/VR survey system 100 can define a plurality of triggering events for displaying a digital survey indicator (and/or presenting a digital survey). Thus, upon detecting one of the triggering events the digital AR/VR survey system 100 can present the corresponding digital survey indicator.

For example, as shown in FIG. 4A, the digital AR/VR survey system 100 determines, via the augmented reality device 402, user interaction with a real-world environmental component (e.g., that a user is viewing a dog with the collar 404). The digital AR/VR survey system 100 references a database of triggering events and determines that viewing a dog with the collar 404 is a triggering event for providing the digital survey indicator 406 (e.g., a digital survey indicator corresponding to a digital survey with survey questions regarding user experience with the collar 404). Accordingly, the digital AR/VR survey system 100 determines that the triggering event is satisfied and provides the digital survey indicator 406 for display via the augmented reality device.

Moreover, as discussed previously, the digital AR/VR survey system 100 can generate a digital survey indicator such that the digital survey indicator is displayed in relation to a real-world environmental component. Specifically, the digital AR/VR survey system 100 can provide the digital survey indicator for display such that the digital survey indicator remains within a certain proximity (on top of or within a distance) of the real-world environmental component.

For example, the digital AR/VR survey system 100 generates the digital survey indicator 406 such that the augmented reality device 402 displays the digital survey indicator 406 in close proximity (e.g., on or within a threshold distance) to the collar 404. In particular, the digital AR/VR survey system 100 generates the digital survey indicator 406 such that even when the collar 404 moves in the view 400, the digital survey indicator 406 will move within the view 400 to follow the collar 404. To illustrate, if the user playfully tosses the dog into the air, the digital survey indicator 406 will move within the view 400 to stay within the proximity of the collar 404 as it rises and falls.

Although FIG. 4A illustrates the digital survey indicator 406 directly on the collar 404, the digital AR/VR survey system 100 can provide the digital survey indicator 406 in a variety of positions in relation to the collar 404 (or other real-world environmental components). For example, the digital AR/VR survey system 100 can provide the digital survey indicator so that it floats above the collar 404, appears slightly below the collar 404, or to the side of the collar 404.

The digital AR/VR survey system 100 can also provide a digital survey indicator in relation to a plurality of real-world environmental components. For example, the digital AR/VR survey system 100 can provide a digital survey indicator in relation to a viewer watching a plurality of people playing a game of football. In particular, the digital AR/VR survey system 100 can detect the plurality of individuals playing a game of football and provide a digital survey indicator (e.g., a digital survey indicator corresponding to a digital survey regarding athletic wear) that hovers over the players.

As mentioned previously, the digital AR/VR survey system 100 can also provide a digital survey indicator in relation to a particular location (e.g., a real world location or place). For example, the digital AR/VR survey system 100 can generate a digital survey regarding new amenities at a museum. The digital AR/VR survey system 100, upon detecting the new amenities within a video stream or digital image received from an augmented reality device, can generate a digital survey indicator that appears next to the new amenities in a view provided by an augmented reality device. Accordingly, individuals walking by the new amenities can provide response data to the museum by interacting with the digital survey indicator and providing responses to one or more digital survey questions.

Similarly, the digital AR/VR survey system 100 can generate a digital survey indicator regarding a company that compares the company to one of its competitors. The digital AR/VR survey system 100 can provide a digital survey indicator via augmented reality devices in relation to a physical store of the competitor (e.g., outside the front door or inside the store) such that users can interact with the digital survey indicator while visiting the competitor's business.

It will be appreciated that although the digital survey indicator 406 of FIG. 4A comprises a digital image (e.g., a digital image of a light bulb) together with text (e.g., "Survey"), the digital survey indicator 406 can comprise only a digital image, only text, or a variety of other augmented reality elements. For example, the digital survey indicator 406 can comprise an audible sound, a digital video, and/or scrolling text.

Indeed, in one or more embodiments, the digital AR/VR survey system 100 selects different types of digital survey indicators. For example, the digital AR/VR survey system 100 can select different digital survey indicators (e.g., digital survey indicators having a different appearance) based on different survey types. In particular, the digital AR/VR survey system 100 can modify the appearance of a digital survey indicator based on the subject matter, length (number of questions/anticipated time), incentives (e.g., cash incentive available), or location of a digital survey. To illustrate, the digital AR/VR survey system 100 can provide a digital survey indicator with a particular visual appearance for a quick survey comprising a small number of survey questions (e.g., a lightning bolt for a single survey question) and a different digital survey indicator for a longer survey comprising a large number of survey questions. Similarly, the digital AR/VR survey system 100 can provide a digital survey indicator with a basketball image for a digital survey in relation to a basketball team and provide a digital survey indicator with an airplane image for a digital survey regarding travel.

Similarly, the digital AR/VR survey system 100 can modify the appearance of a digital survey indicator based on location or surrounding environment of a digital survey provided via an AR/VR device. For example, the digital AR/VR survey system 100 can generate a bright digital survey indicator inside of a dance club with dimmed lights and generate a darker digital survey indicator at an outside amusement park.

In addition, although the embodiment of FIG. 4A provides the digital survey indicator 406 in response to a particular user interaction (i.e. a trigger event), it will be appreciated that the digital AR/VR survey system 100 can provide a digital survey indicator in response to a variety of other user interactions. In particular, the digital AR/VR survey system 100 can detect a user interaction with any real-world environmental component and, in response, provide a digital survey indicator (and/or digital survey). To illustrate, the digital AR/VR survey system 100 can detect that a user has completed shopping, and in response, provide a digital survey indicator (e.g., for a survey directed to shopping). Similarly, the digital AR/VR survey system 100 can detect that a user is eating at a particular restaurant and provide a digital survey indicator (e.g., for a survey directed to the restaurant). Moreover, the digital AR/VR survey system 100 can detect that a user is utilizing a particular product and provide a digital survey indicator (e.g., for a survey directed to the particular product). Furthermore, the digital AR/VR survey system 100 can detect that a user is sitting in an airplane and provide a digital survey indicator (e.g., for a survey directed to the customer service on the flight).

As mentioned previously, the digital AR/VR survey system 100 can also wait until a particular moment in time to provide a digital survey indicator. For example, the digital AR/VR survey system 100 can detect that a user selects a particular product to purchase at the store. The digital AR/VR survey system 100 can wait until the user has purchased the product, exited the store, and returned home before providing the digital survey indicator. In this manner, the digital AR/VR survey system 100 can wait until the user is in a better position to respond to a digital survey before providing the digital survey indicator.

In one or more embodiments, upon detecting a trigger for a digital survey, the digital AR/VR survey system 100 monitors user activity to detect a second trigger to determine the timing to provide the digital survey indicator. For instance, and as explained above, the digital AR/VR survey system 100 can detect that a user selects a particular product to purchase at the store (e.g., the first trigger). The digital AR/VR survey system 100 can then monitor user activity to determine a moment in time where the user is likely to have time to respond to a digital survey. For example, the digital AR/VR survey system 100 can detect a user has not changed location for a defined period of time (e.g., the second trigger). This second trigger can include one or more types of action or inaction. As another example, and based on the video stream or digital images received from an augmented reality device, the digital AR/VR survey system 100 can have a second trigger that includes verifying that the user is not driving, not working, and not speaking to another person. Thus, after detecting the first trigger of purchasing a product, the system identifies the second trigger to determine the timing of presenting the digital survey indicator to the user via the augmented reality device.

Furthermore, although FIG. 4A illustrates a digital survey indicator provided in relation to a particular real-world environmental component (i.e., the collar 404), it will be appreciated that the digital AR/VR survey system 100 can provide digital survey indicators in a different location and in relation to different elements. For example, FIGS. 4B, 4C illustrate alternative approaches to providing a digital survey indicator in accordance with one or more embodiments.

Figure 4B:
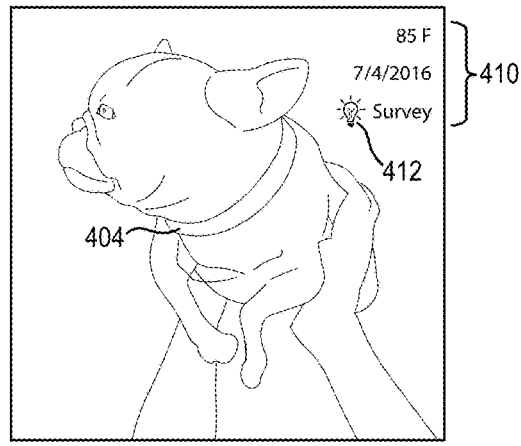
Figure 4C:
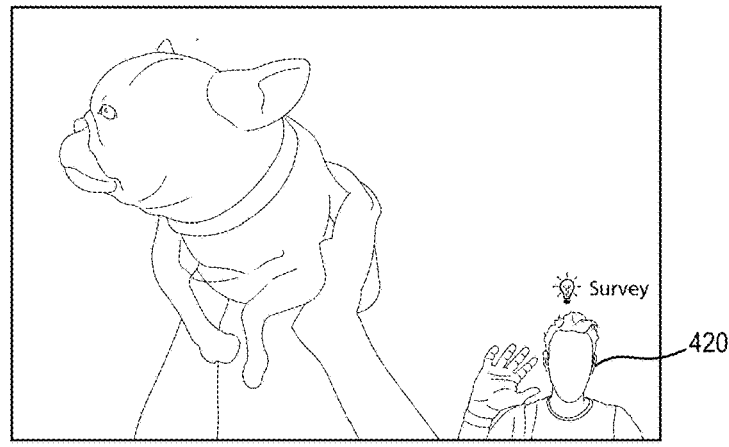

In particular, FIG. 4B illustrates the view 400 via the augmented reality device 402 and a notification bar 410. The notification bar 410 is an augmented reality element that remains stationary within the view 100 (e.g., always floats in the upper right hand corner) and provides notifications and other information to a user of the augmented reality device 402. In one or more embodiments, the digital AR/VR survey system 100 provides digital survey indicators via the notification bar 410. For example, as illustrated the digital AR/VR survey system 100 provides a digital survey indicator 412 for display via the notification bar 410 (e.g., in response to user interaction with the collar 404).

In addition to the notification bar 410, the digital AR/VR survey system 100 can provide digital survey indicators in relation to other augmented reality elements. Indeed, it will be appreciated that the augmented reality device can provide augmented reality elements for educational, entertainment, and/or employment purposes. The digital AR/VR survey system 100 can provide digital survey indicators in relation to any of these augmented reality elements.

For example, the augmented reality device 402 can provide an augmented reality element for display to a user as part of an educational lesson (e.g., a digital model of an airplane as part of a lesson on airplanes). The digital AR/VR survey system 100 can provide a digital survey indicator in conjunction with the graphical user interface (e.g., so that the augmented reality element hovers in proximity to the digital model of the airplane). In this manner, the digital AR/VR survey system 100 can also provide digital surveys in relation to augmented reality elements (e.g., provide a survey regarding the digital model, the educational program utilizing the digital model, or a teacher of the lesson).

FIG. 4C illustrates an additional digital survey indicator in the view 400 displayed via the augmented reality device 402. In particular, the view 400 includes a digital survey indicator 420 that comprises a visual representation of an individual (e.g., an avatar). As shown, in one or more embodiments, the digital AR/VR survey system 100 generates an augmented reality element of an avatar as the digital survey indicator 420. Upon user interaction with the digital survey indicator 420, the digital AR/VR survey system 100 can provide a digital survey to the user (e.g., in an interview with the avatar). Indeed, upon user interaction with any of the digital survey indicators 406, 412, 420, the digital AR/VR survey system 100 can provide a digital survey via the augmented reality device 402.

As discussed above, the digital AR/VR survey system 100 can provide a digital survey in a variety of forms. For instance, the digital AR/VR survey system 100 can provide a digital survey utilizing audio, text, video, or interactive augmented reality elements. For example, the avatar portrayed in the digital survey indicator 420 (i.e., the avatar) can provide one or more survey questions (e.g., provide an audible survey question or a text survey question). Similarly, the digital AR/VR survey system 100 can provide a digital survey in the form of text augmented reality elements and/or as a digital video augmented reality element.

In addition, in one or more embodiments the digital AR/VR survey system 100 provides a digital survey via an augmented reality screen. In particular, the digital AR/VR survey system 100 can generate an augmented reality element that has a similar appearance to a touch screen. The digital AR/VR survey system 100 can present a digital survey via the augmented reality screen. To illustrate, the digital AR/VR survey system 100 can place the augmented reality screen on a real-world environmental component (e.g., such that the augmented reality screen appears to be lying on a table). The digital AR/VR survey system 100 can provide a digital survey as text or other augmented reality elements such that they appear on the augmented reality screen.

In one or more embodiments, the digital AR/VR system 100 can provide a digital survey in a particular presentation style based on real world environmental components and/or augmented reality elements available in a particular view. For example, as just mentioned, the digital AR/VR system 100 can detect a table in a view via an augmented reality device and provide the digital survey in relation to the table (e.g., on an augmented reality screen lying on the table). However, in the absence of a table in a particular view, digital AR/VR system 100 can provide the digital survey in an alternate presentation style. For example, the digital AR/VR system 100 can provide the digital survey as an augmented reality element that appears to float in the air or on an augmented reality screen on a wall within the particular view.

Figure 4D:
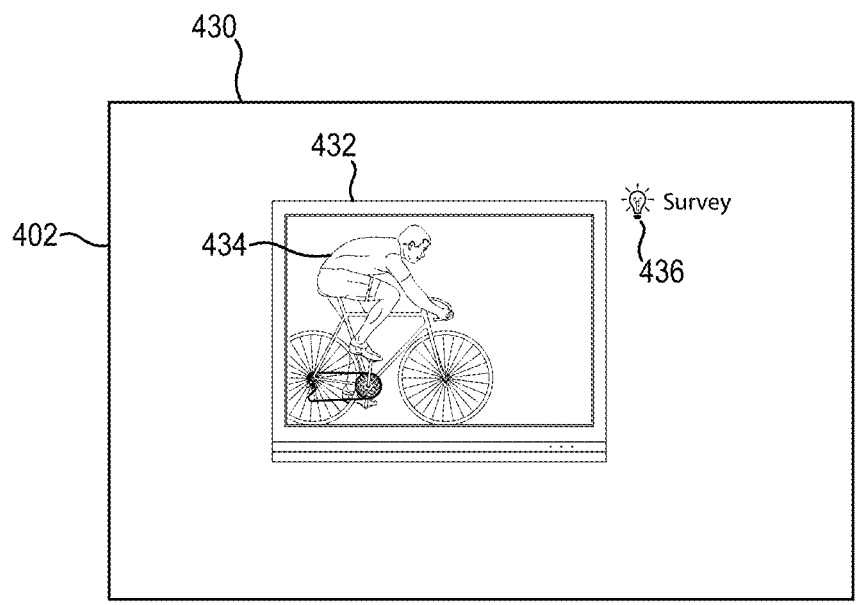
Figure 4E:
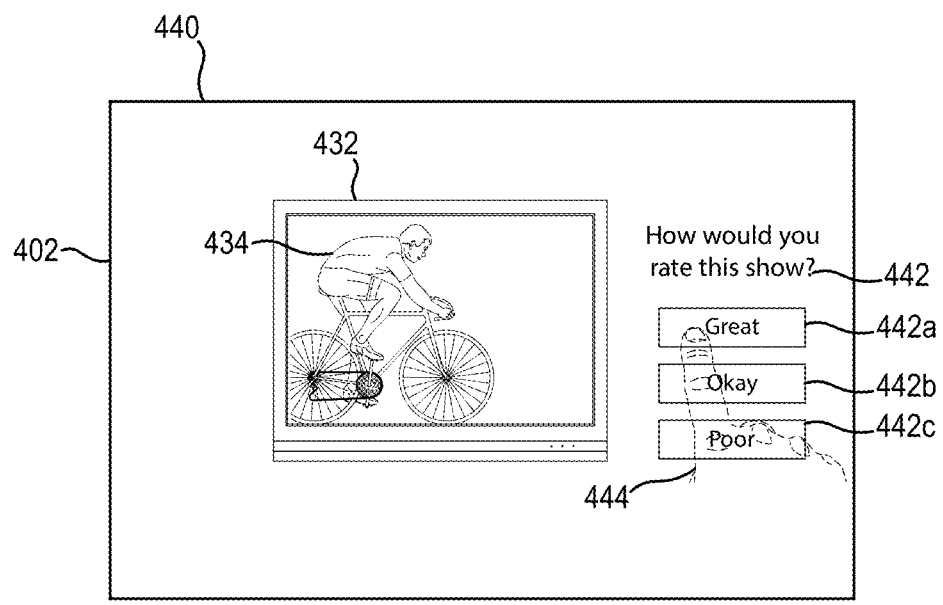

The digital AR/VR survey system 100 can also provide digital surveys in relation to one or more real-world environmental components. Indeed, FIGS. 4D and 4E illustrate providing a digital survey indicator and digital survey in relation to a real-world environmental component. Specifically, FIG. 4D illustrates a view 430 via the augmented reality device 402 of a television 432 displaying media content 434. As discussed previously, the digital AR/VR survey system 100 can detect user interaction with a real-world component and, in response, provide a digital survey indicator. In relation to FIG. 4D, the digital AR/VR survey system 100 determines, via the augmented reality device 402 that the user is watching the medial content 434 (e.g., a particular movie). In response, the digital AR/VR survey system 100 provides a digital survey indicator 436. Specifically, the digital AR/VR survey system 100 accesses a database of triggering events and determines that user interaction with the media content 434 (e.g., viewing the media content 434) is a triggering event for providing the digital survey indicator 436.

Moreover, as mentioned, the digital AR/VR survey system 100 can identify user interaction with a digital survey indicator, and, in response, provide a digital survey via an augmented reality device. For example, FIG. 4E illustrates providing a digital survey via an augmented reality device upon user interaction with a digital survey indicator. In particular, FIG. 4E illustrates a view 440 via the augmented reality device 402 that includes the television 432 and a survey question 442 with selectable options 442*a*-442*c* provided as an augmented reality element.

In relation to the embodiment of FIG. 4E, the digital AR/VR survey system 100 provides the survey question 442 based on user interaction with the digital survey indicator 436. As mentioned above, the digital AR/VR survey system 100 can identify a variety of user interactions. For example, the digital AR/VR survey system 100 can determine that a user points at, selects, looks at, or otherwise gestures toward the digital survey indicator 436.

As discussed, the digital AR/VR survey system 100 can provide digital surveys in relation to a real-world environmental component. As shown in FIG. 4E, the digital AR/VR survey system 100 provides the survey question 442 for display next to the television 432. Specifically, the digital AR/VR survey system 100 provides the survey question for display via the augmented reality device 402 such that, if a user of the augmented reality device 402 changes the view 440 (e.g., the user's head turns), the digital AR/VR survey system 100 can modify the location of the survey question 442 so that the survey question 442 maintains its position relative to the television 432 and/or the media content 434 in the view 440.

It will be appreciated that the digital AR/VR survey system 100 can position the survey question 442 in relation to the television 432 in a variety of ways. For example, the digital AR/VR survey system 100 can place the survey question 442 above, below, next to, or on top of the television 432. Moreover, the digital AR/VR survey system 100 can modify the location (e.g., if the user turns to the left such that the current location of the survey question 442 is outside the view 440, the digital AR/VR survey system 100 can change the location of the survey question 442 from the right side of the television 432 to the left side of the television 432).

In addition, in the event that the user of the augmented reality device 402 changes the view 440 to an extent that the television 432 is no longer in view (e.g., the user turns their head by 180 degrees, or the user leaves the room), in one or more embodiments, the digital AR/VR system 100 continues to provide the digital survey in relation to a different real world environmental component. For example, if the television 432 is no longer in view, the digital AR/VR system can provide the survey question 442 in relation to a remote control or as an augmented reality element in a notification bar. In other embodiments, upon changing the view 440 so that the television 432 is no longer in view, the digital AR/VR system 100 ceases providing the digital survey until the television 432 comes back into view (e.g., until the user turns their head back toward the television 432). In other embodiments, upon changing the 440 so that the television 432 is out of view, the digital AR/VR system 100 replaces a digital survey with a digital survey indicator (e.g., to signal to the user that a digital survey is still available, even though the user turns away from the digital survey). Furthermore, in one or more embodiments, the digital AR/VR system provides a notification as an augmented reality element prompting the respondent to finish the survey (e.g., "Do you want to finish the digital survey now or later?").

In addition to positioning a digital survey in relation to a real-world environmental component, the digital AR/VR survey system 100 can also provide digital surveys in relation to augmented reality elements. For example, in one or more embodiments, the augmented reality device 402 can provide the television 432 and the media content 434 as an augmented reality element (i.e., the television 432 is not a real television but an augmented reality television). The digital AR/VR survey system 100 can position the survey question 442 in relation to the television 432 and/or the media content 434 even if they are provided for display as augmented reality elements.

Moreover, as discussed above, the digital AR/VR survey system 100 can generate a digital survey such that the survey is directed to target respondents with particular characteristics. The digital AR/VR survey system 100 can monitor user profiles and/or user interactions to identify respondents with the particular characteristics. To illustrate, the digital AR/VR survey system 100 can generate a digital survey with a feature that indicates the digital survey should be provided to a respondent that is female and drinking a diet soda. The digital AR/VR survey system 100 can monitor user input of a plurality of augmented reality devices to identify females drinking a diet soda, and in response, provide the digital survey.

It will be appreciated that digital AR/VR system 100 can monitor multiple user interactions to determine target respondents. For instance, the digital AR/VR system 100 can identify a particular target respondent based on a plurality of monitored user interactions over a period of time. To illustrate, rather than identifying females that drink a diet soda, the digital AR/VR system 100 can identify females that drink at least three diet sodas in a day. Specifically, as discussed previously, the digital AR/VR system 100 can monitor when users drink diet sodas and store the monitored information in a user profile corresponding to the user. The digital AR/VR system 100 can detect, via the user profile, that a female has consumed a third diet soda in a day, and in response, provide a digital survey.

Furthermore, in providing digital surveys, the digital AR/VR survey system 100 can also select one or more survey questions to provide for display. Indeed, as discussed above, in one or more embodiments the digital AR/VR survey system 100 can generate a decision-tree (or other algorithm) that identifies questions to provide in response to particular user interactions. Accordingly, the digital AR/VR survey system 100 can select survey questions based on a variety of factors, including user interactions with real-world components, user interactions with augmented reality elements, and/or user profile data. To illustrate, the digital AR/VR survey system 100 can select a survey question based on a user visiting a particular location, engaging in certain conduct, or interacting with a particular object. Similarly, the digital AR/VR survey system 100 can select a survey question based on a user's demographic information (e.g., age or gender), preferences, interests, computing devices (e.g., Mac or PC), operating system, browser, or other information stored in a user profile.

As mentioned above, the digital AR/VR survey system 100 can also identify response data. In particular, the digital AR/VR survey system 100 can identify response data based on user interactions with a digital survey via an augmented reality device. For example, as shown in FIG. 4E, the digital AR/VR survey system 100 can identify selection of the option 442*a*. In particular, the digital AR/VR survey system 100 can receive user input indicating that the user of the augmented reality device 402 pointed at the option 442*a* utilizing their hand 444. Based on the user pointing at the option 442a, the digital AR/VR survey system 100 can determine the user response to the survey question 442 (e.g., "Great").

It will be appreciated that the digital AR/VR survey system 100 can receive response data from a variety of user interactions, including selection of an option, text input, an audible response, or biometric input. For example, in relation to FIG. 4E, in addition to detecting user selection of the option 442a, the digital AR/VR survey system 100 can track biometric data via the augmented reality device (e.g., heart rate or heart pressure). The digital AR/VR survey system 100 can identify both the selection of the option 442a and the biometric data as response data.

By collecting biometric data together with user selections, the digital AR/VR survey system 100 can assist administrators in identifying correlations between user opinions and physical responses. For example, the digital AR/VR survey system 100 can determine that products that cause an increase in heart rate tend to result in more favorable (or less favorable) consumer opinions.

Although FIGS. 4D-4E illustrate providing a digital survey indicator prior to providing a digital survey, it will be appreciated that in one or more embodiments, the digital AR/VR survey system 100 provides a digital survey directly (without first providing a digital survey indicator). For example, utilizing similar methods described above, the digital AR/VR survey system 100 can detect a user interaction (e.g., a triggering event) and provide a digital survey in relation to the collar 404, via the notification bar 410, or via the digital survey indicator 420. Similarly, upon detecting user interaction with the television 432 and/or the media content 434, the digital AR/VR survey system 100 can provide the survey question 442 (e.g., without first providing the digital survey indicator 436). The digital AR/VR survey system 100 can provide a digital survey (e.g., identify timing and position of a digital survey) as described above in relation to digital survey indicators.

As mentioned above, in one or more embodiments, the digital AR/VR survey system 100 can iteratively generate digital surveys based on user interaction via an augmented reality device. In particular, the digital AR/VR survey system 100 can provide a first survey question, detect user interaction with a real-world environmental component and/or augmented reality component, and select a second survey question based on the detected user interaction.

Figure 4F:
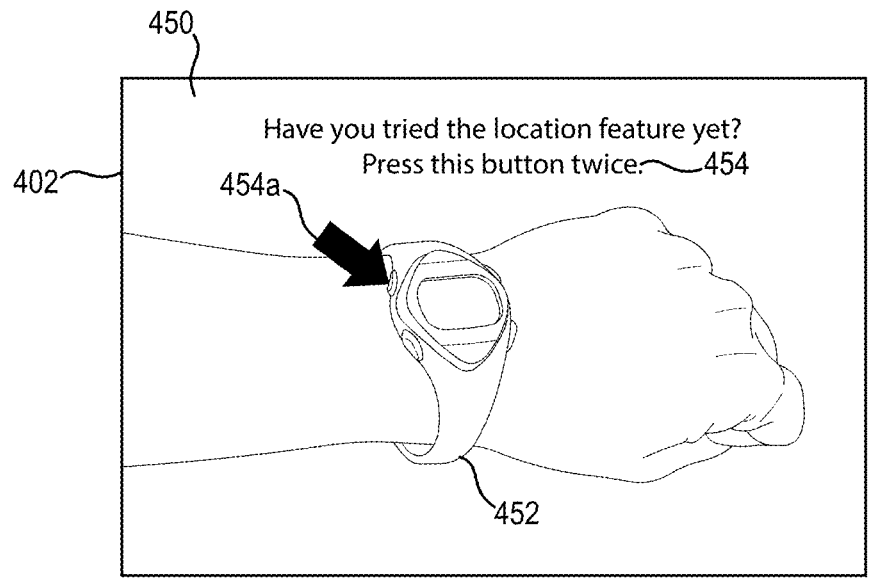

For example, FIG. 4F illustrates iteratively generating and providing a digital survey based on user interaction with a real-world environmental component and/or an augmented reality element in accordance with one or more embodiments. In particular, FIG. 4F illustrates a view 450 of a watch 452 via the augmented reality device 402. Upon detecting user interaction with the watch 452 (e.g., that a user of the augmented reality device 402 is wearing the watch 452 or that a user of the augmented reality device 402 has never utilized a location feature of the watch 452), the digital AR/VR survey system 100 provides a first survey question 454 in the form of an augmented reality element. Specifically, the first survey question 454 comprises a text question and instructions (e.g., "Have you tried the location feature yet? Press this button twice.") Moreover, the first survey question 454 includes an augmented reality element in the form of an arrow 454a providing a visual indication for how to activate the location feature on the watch 452.

Upon providing the first survey questions 454 for display, the digital AR/VR survey system 100 monitors user interaction with the watch 452 via the augmented reality device 402. Moreover, based on the monitored user interaction, the digital AR/VR survey system 100 can provide another question for display. In this manner, the digital AR/VR survey system 100 can provide interactive and responsive survey questions based on user interaction.

Figure 4G:
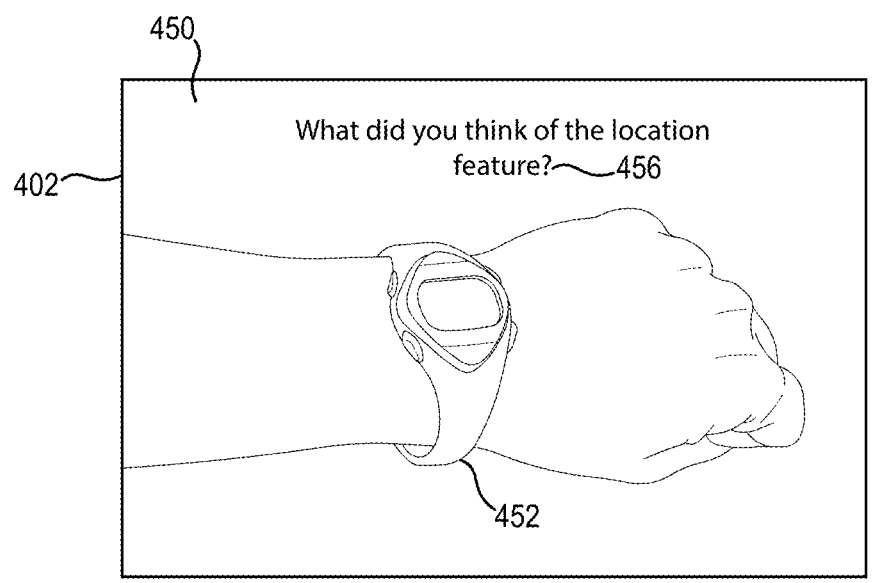

For example, the digital AR/VR survey system 100 can monitor user interactions with the watch 452 and determine if the user of the augmented reality device 402 activates the location feature on the watch 452. Upon detecting that the user activates the location feature of the watch 452, as shown in FIG. 4G, the digital AR/VR survey system 100 provides for display a second survey question 456. In other words, detecting that the user activates the location feature of the watch 452 generates response data to the survey question.

The digital AR/VR survey system 100 can also detect user interaction with the second survey question 456 and gather response data. For example, the digital AR/VR survey system 100 can detect an audible response, entry of text, selection of selectable options, or some other user interaction. Moreover, the digital AR/VR survey system 100 can continue to provide additional survey questions upon detecting user interaction via the augmented reality device 402.

Although FIG. 4G illustrates the second survey question 456 upon detection of a particular user interaction with the watch 452, it will be appreciated that the digital AR/VR survey system 100 can provide alternative survey questions in response to different user interactions. For example, if the user goes a period of time without activating the location feature, the digital AR/VR survey system 100 can provide a second survey question regarding the location of the location feature and whether the location feature is difficult to find. Similarly, if the user activates the location feature, but takes a significant amount of time to do so, the digital AR/VR survey system 100 can generate a survey question regarding the time it takes to identify the location feature. In this manner, the digital AR/VR survey system 100 can utilize an augmented reality device to provide an interactive digital survey that provides survey questions in response to perceived user interactions.

Moreover, although FIG. 4G illustrates the second survey question 456 upon detection of a particular user interaction with the watch 452, it will be appreciated that the digital AR/VR survey system 100 can provide alternative survey questions in response to different user interactions. For example, if the user goes a period of time without activating the location feature, the digital AR/VR survey system 100 can provide a second survey question regarding the location of the location feature and whether the location feature is difficult to find. Similarly, if the user activates the location feature, but takes a significant amount of time to do so, the digital AR/VR survey system 100 can generate a survey question regarding the time it takes to identify the location feature. In this manner, the digital AR/VR survey system 100 can utilize an augmented reality device to provide an interactive digital survey that provides survey questions in response to user interactions.

In addition to providing digital surveys in relation to a watch, the digital AR/VR survey system 100 can also provide digital surveys in relation to individuals. Indeed, the digital AR/VR survey system 100 allows administrators (or other users) to generate and provide digital surveys via an augmented reality device in relation to particular individuals. To illustrate, an administrator can sell a product (e.g., a shirt) to a consumer and obtain permission from the consumer to provide an augmented reality survey in relation to the consumer when the consumer utilizes the product (e.g., the shirt).

For example, FIG. 4G illustrates a view 460 via the augmented reality device 402 comprising an individual 462. The digital AR/VR survey system 100 provides for display via the augmented reality device 402 a survey question 464 (with selectable options 464a-464b) as an augmented reality element in relation to the individual 462. In particular, the individual 462 provided permissions upon purchasing a shirt (e.g., in return for an incentive, such as a discount on the shirt) to allow administration of a digital survey in conjunction with wearing the shirt. Accordingly, when users of an augmented reality device view the individual 462, the digital AR/VR survey system 100 provides the survey question 464.

Figure 4H:
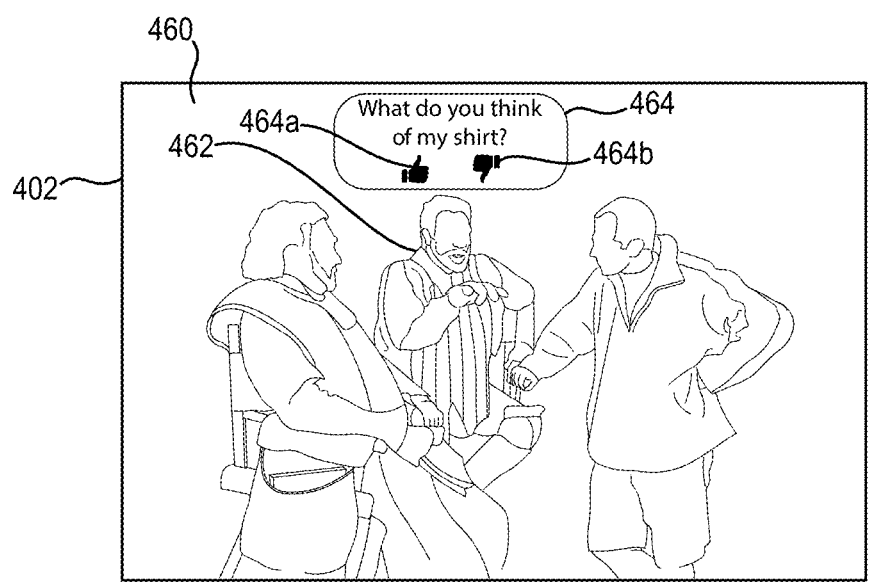

In addition to allowing administrators to provide survey questions in relation to other individuals, the digital AR/VR survey system 100 also allows users to generate digital surveys (e.g., digital surveys that are provided for display when respondents view the users utilizing augmented reality devices). Thus, and as illustrated in FIG. 4H, in one or more embodiments, an individual 462 can generate a digital survey such that when other users view the individual 462 via augmented reality devices, the individual 462 is shown together with a digital survey (e.g., the survey question 464). Accordingly, when the individual 462 comes into the view 460 via the augmented reality device 402, the digital AR/VR survey system 100 generates and provides the survey question 464. In this manner, the digital AR/VR survey system 100 can allow individuals to present their own digital surveys (e.g., as a manner of interacting with other users of augmented reality devices).

In providing digital surveys, the digital AR/VR survey system 100 can also limit or control the number or identity of other users that are permitted to see one or more digital surveys as augmented reality elements. For example, the individual 462 can specify that only certain individuals having augmented reality devices (e.g., connections in a contact list) will be presented with the survey question 464. In this manner, the digital AR/VR survey system 100 can provide digital surveys in relation to individuals, while also maintaining privacy.

It will be appreciated that although FIGS. 4A-4H illustrate digital survey indicators and/or digital surveys implemented as visual elements (i.e., visual augmented reality elements), the digital AR/VR survey system 100 can also provide audible augment reality elements. Indeed, in one or more embodiments, the digital AR/VR survey system 100 provides digital survey indicators and/or digital surveys utilizing exclusively audible (not visual) augmented reality elements.

For example, in response to detecting a trigger, the digital AR/VR survey system 100 can provide an audible digital survey indicator via an augmented reality device. In particular, the digital AR/VR survey system 100 can provide a voice or other audible noise (e.g., a bell ringing) indicating a digital survey is available.

Similar to other digital survey indicators, the digital AR/VR survey system 100 can also provide an audible digital survey indicator in relation to a real-world environmental component or augmented-reality element. For example, the digital AR/VR survey system 100 can provide an audible augmented reality element such that it sounds to a user like the audible augmented reality element is originating from a direction corresponding to a real-world environment component or augmented-reality element.

The digital AR/VR survey system 100 can also detect a user interaction with an audible digital survey indicator. For example, the digital AR/VR survey system 100 can detect a voice response from a user indicating a desire to take a digital survey.

Similarly, the digital AR/VR survey system 100 can also provide a digital survey via audible augmented reality elements. For example, upon user interaction with a digital survey indicator, the digital AR/VR survey system 100 can provide audible questions to the user. Furthermore, the digital AR/VR survey system 100 can detect audible (or other types of) responses.

As discussed previously, in addition to augmented reality devices, the digital AR/VR survey system 100 can also provide digital surveys via virtual reality devices. In particular, the digital AR/VR survey system 100 can provide digital survey indicators, provide survey questions, and receive response data via virtual reality devices. In this vein, FIGS. 5A-5H illustrate administering digital surveys via a virtual reality device in accordance with one or more embodiments.

Figure 5A:
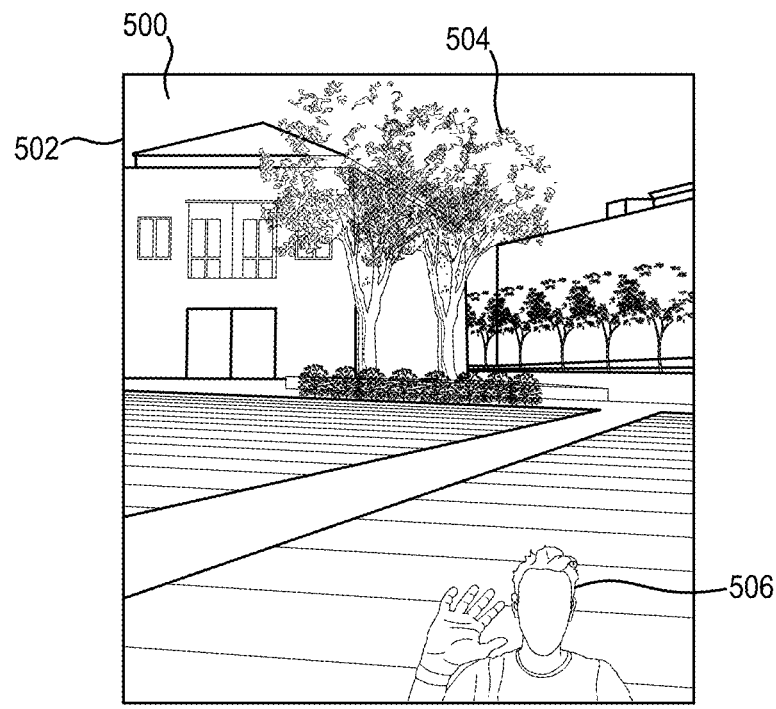
FIGS. 5A-5H illustrate representations of providing a digital survey in relation to a virtual reality device in accordance with one or more embodiments.

For example, FIG. 5A illustrates a virtual environment 500 provided for display via a virtual reality device 502. The virtual environment 500 comprises a plurality of virtual elements, such as the virtual tree 504. As mentioned previously in relation to virtual environments generally, a user of the virtual reality device 502 can travel to a variety of virtual locations, interact with other users (e.g., via virtual avatars), and/or participate in virtual activities (e.g., virtual games or virtual shopping) in the virtual environment 500.

The virtual device 502 comprises a headset with a screen capable of providing three-dimensional representations of the virtual environment 500. In particular, the virtual device 502 comprises a headset that detects movements, gestures, and other user input and modifies a view of the virtual environment 500 in response to the detected user input.

The digital AR/VR survey system 100 can monitor user interactions via the virtual reality device 502 with the virtual environment 500. For example, the digital AR/VR survey system 100 can monitor locations, activities, or purchases of a user of the virtual reality device 502. Moreover, based on monitored user interactions the digital AR/VR survey system 100 can provide a digital survey indicator and/or digital survey in relation to the virtual environment 500.

For example, FIG. 5A illustrates a digital survey indicator 506 comprising an avatar within the virtual environment 500. The digital survey indicator 506 can ask the user of the virtual reality device 502 to participate in a digital survey. Moreover, the digital survey indicator 506 can ask survey questions, receive responses, and interact with the user of the virtual reality device 502. To illustrate, the digital survey indicator 506 can ask if a user wishes to participate in a digital survey and then provide the digital survey via an interview (e.g., audible questions and responses or written questions and responses). In this manner, the digital AR/VR survey system 100 can provide a digital survey via an interactive correspondence with an avatar in a virtual environment.

Figure 5B:
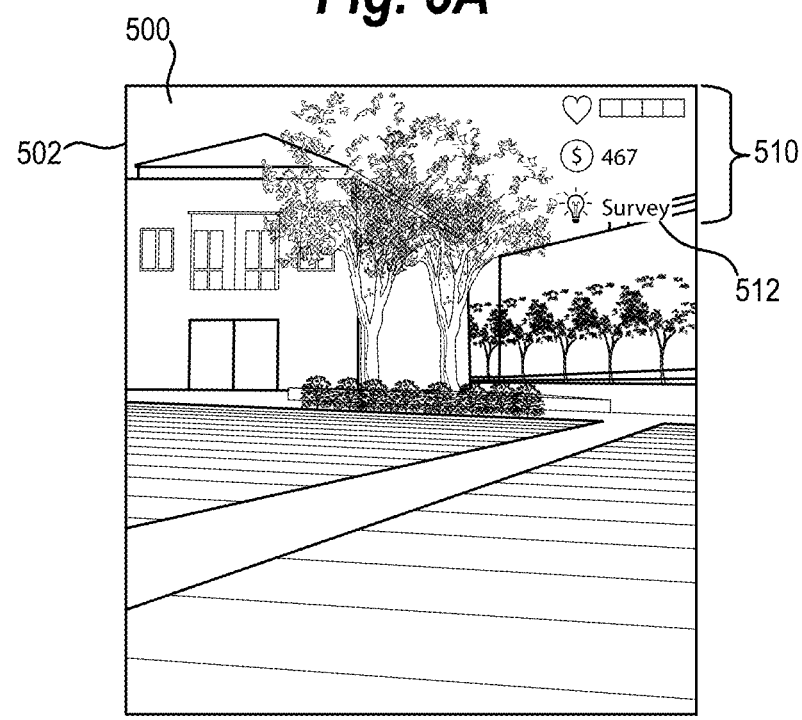

The digital AR/VR survey system 100 can provide a variety of other digital survey indicators. For example, FIG. 5B illustrates a virtual notification bar 510 with a digital survey indicator 512 provided as a virtual element. The digital AR/VR survey system 100 can detect selection of the digital survey indicator 512 and administer a digital survey (e.g., audible question and answers, textual questions and answers, etc.).

Figure 5C:
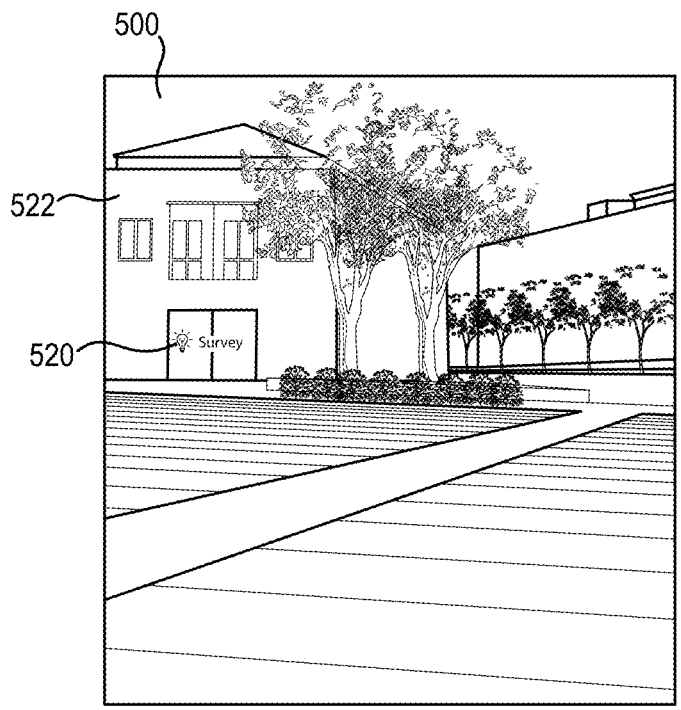

Similar to the digital survey indicators discussed above in relation to augmented reality devices, the digital AR/VR survey system 100 can also provide digital survey indicators in a virtual environment in relation to other virtual elements. For example, FIG. 5C illustrates the environment 500 with a digital survey indicator 520 provided for display in relation to a virtual building 522. As a user moves in the virtual environment 500, the digital survey indicator 520 will remain within a proximity (or distance) of the building 522.

Furthermore, the digital AR/VR survey system 100 can provide digital survey indicators based on user interaction with the virtual environment 500. For example, the digital AR/VR survey system 100 can determine that a user has previously visited the building 522 and detect that the user is in the vicinity of the building 522. Accordingly, the digital AR/VR survey system 100 can provide the digital survey indicator 520 (corresponding to a digital survey regarding the building 522).

Figure 5D:
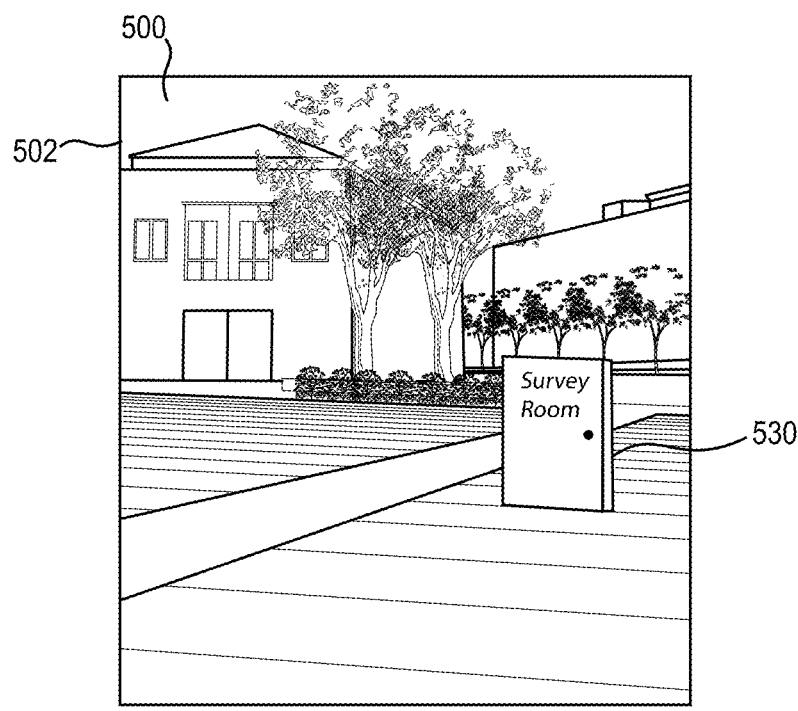

As briefly mentioned above, the digital AR/VR survey system 100 can also provide a dedicated virtual survey environment for administering digital surveys. For example, FIG. 5D illustrates the virtual environment 500 with a digital survey indicator 530 comprising a virtual door (e.g., for entering a digital "survey room"). A user can interact with the digital survey indicator 530 (e.g., open the door) to enter a dedicated virtual survey environment.

Figure 5E:
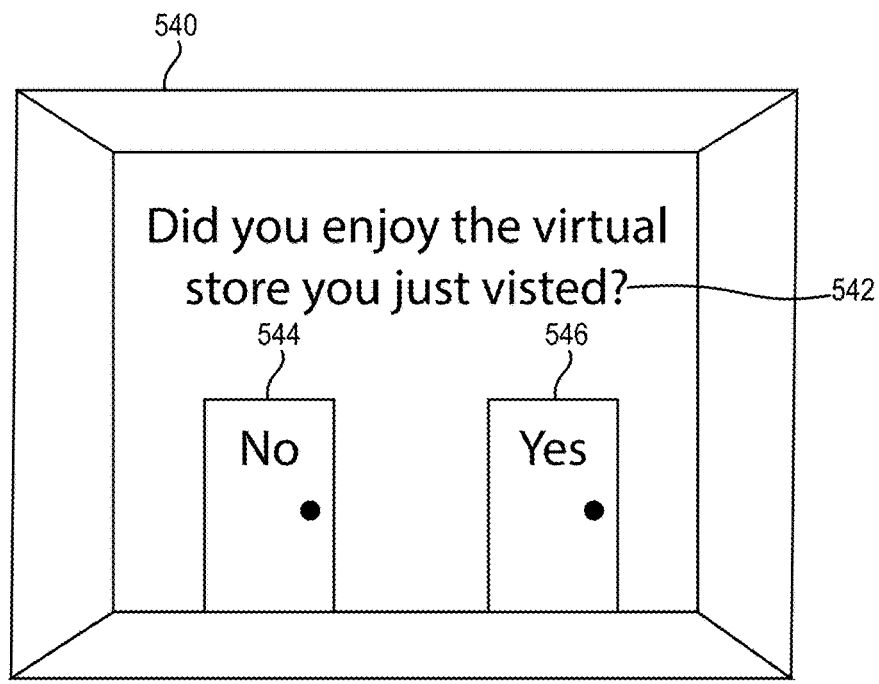

In particular, FIG. 5E illustrates a virtual survey environment 540 (e.g., a survey room upon user interaction with the digital survey indicator 530). Although FIG. 5E illustrates the virtual survey environment 540 as a room, it will be appreciated that the virtual survey environment 540 can comprise different virtual surroundings. For example, the virtual survey environment 540 can appear as a building, natural surroundings (e.g., a forest with a path), or some other surroundings.

As shown in FIG. 5E, the virtual survey environment 540 comprises a survey question 542 with virtual response elements 544, 546. Specifically, the survey question 542 comprises a virtual text element and the virtual response elements 544, 546 comprise virtual doors. A respondent can respond to the survey question 542 based on user interaction with the virtual response elements 544, 546. For instance, the respondent can move within the virtual survey environment 500 (e.g., move an avatar or other representation of the respondent) toward the virtual response element 544 and interact with the virtual response element 544. For example, the respondent can open the virtual response element 544 and walk through the door.

Furthermore, upon walking through the virtual response element 544, the digital AR/VR survey system 100 can provide an additional virtual survey environment with an additional survey question and additional virtual response elements. Accordingly, in one or embodiments, the digital AR/VR survey system 100 allows the respondent to move through various rooms as the respondent responds to a survey.

Moreover, in one or more embodiments, the digital AR/VR system 100 can modify the appearance of virtual survey environments (e.g., to increase engagement, give users motivation to continue to different virtual survey rooms, and increase the percentage of completed surveys). Indeed, the digital AR/VR system 100 an modify the appearance of virtual survey environments based on a variety of factors, including digital survey questions, digital survey responses (i.e., response data), and/or a user profile.

For example, the digital AR/VR system 100 can provide a digital survey regarding vacations, and the digital AR/VR system 100 can modify the appearance of virtual survey environments based on responses to the digital survey. For example, the digital AR/VR survey system 100 can detect response data that indicates a respondent likes vacations at the beach, and, in response, provide a virtual survey environment that corresponds to a beach environment (e.g., when the respondent walks through a door corresponding to a beach, the next survey room is in a beach environment).

Figure 5F:
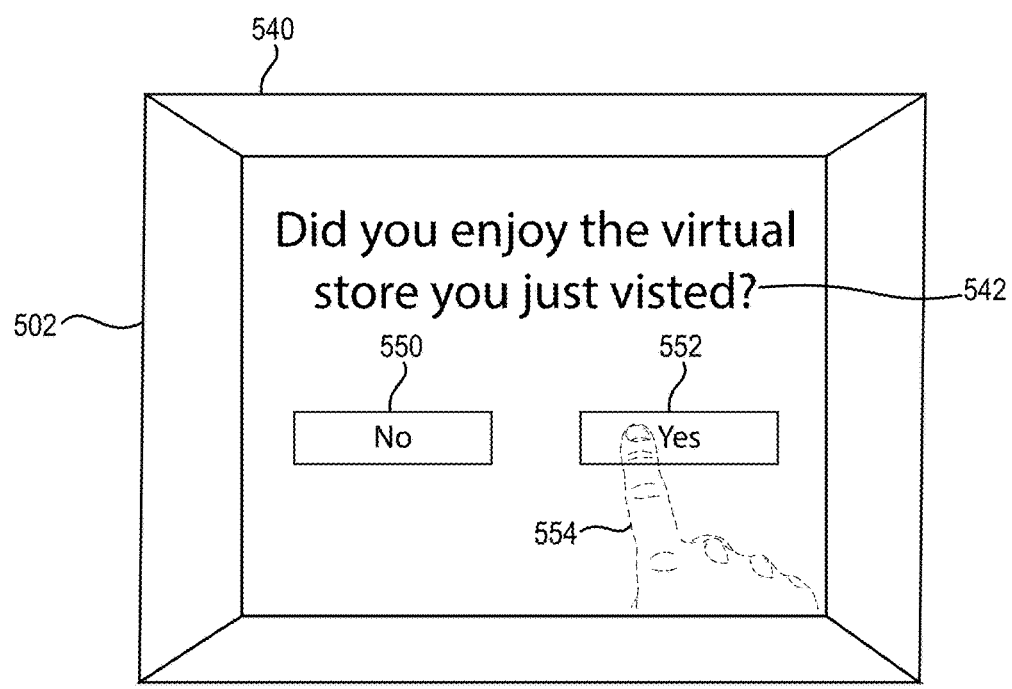

In addition to interactive movement through rooms, it will be appreciated that the digital AR/VR survey system 100 can provide survey questions and receive response data in a variety of forms in a virtual environment. For example, FIG. 5F illustrates the survey question 542 together with selectable virtual elements 550, 552. As shown, the digital AR/VR survey system 100 can receive response data based on user interaction with the selectable virtual element 552 via a hand 554. Specifically, the respondent can utilize the hand 554 to gesture toward (e.g., point a finger toward) the selectable virtual element 552.

Figure 5G:
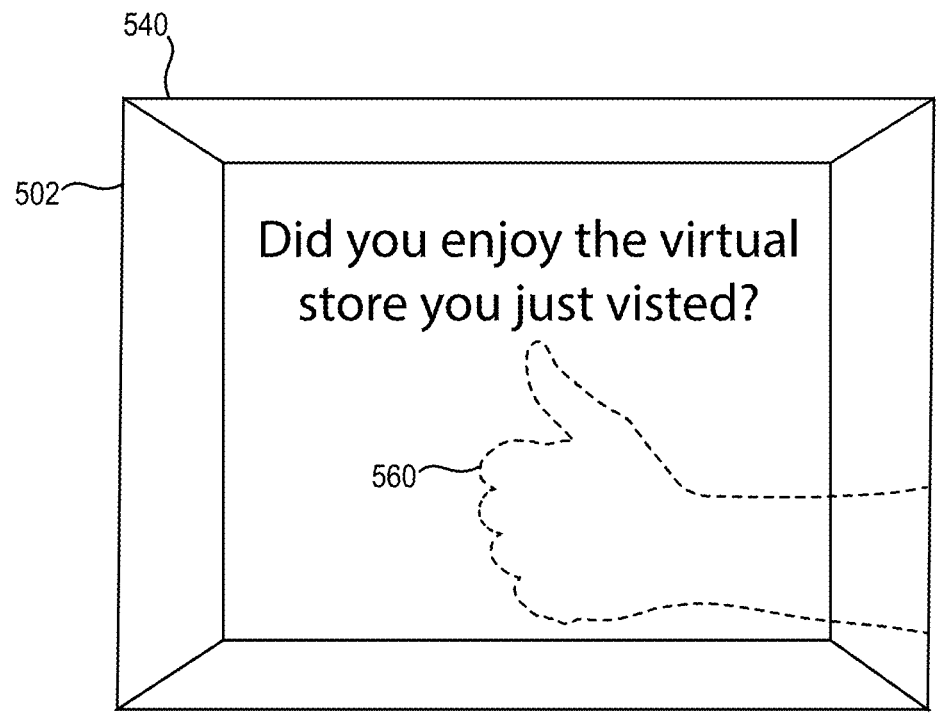

The digital AR/VR survey system 100 can detect a variety of additional gestures in identifying response data. For example, as shown in FIG. 5G, the digital AR/VR survey system 100 can receive response data based on a thumbs up gesture 560. Specifically, the virtual reality device 502 can detect (e.g., via gloves or a camera) that a user makes the thumbs up gesture 560 (or a thumbs down gesture). Based on the thumbs up gesture 560 the digital AR/VR survey system 100 can determine response data.

In addition, to the gestures illustrated in FIGS. 5F, 5G, the digital AR/VR survey system 100 can identify response data based on a variety of additional user interactions. For instance, the digital AR/VR survey system 100 can detect a variety of additional gestures (e.g., point and shoot of a finger, placing a palm over a selectable option, punching an option with a closed fist). In addition, the digital AR/VR survey system 100 can determine response data based on a respondent looking (e.g., focusing eyes or turning a head) toward a particular virtual element. Similarly, the digital AR/VR survey system 100 can determine response data from user interaction with a controller (e.g., movement of a controller joystick and selection of a controller button) or keyboard. Furthermore, the digital AR/VR survey system 100 can provide a virtual monitor for display and the digital AR/VR survey system 100 can identify user interaction with the virtual monitor.

The digital AR/VR survey system 100 can also iteratively administer a digital survey based on ongoing user interactions with a virtual object. For instance, the digital AR/VR survey system 100 can administer a digital survey by providing a virtual object and monitoring user interaction with the virtual object. Based on the monitored user interaction, the digital AR/VR survey system 100 can generate survey questions. The digital AR/VR survey system 100 can obtain response data to the survey questions in the form of a selection, audible response, text response, etc.

Figure 5H:
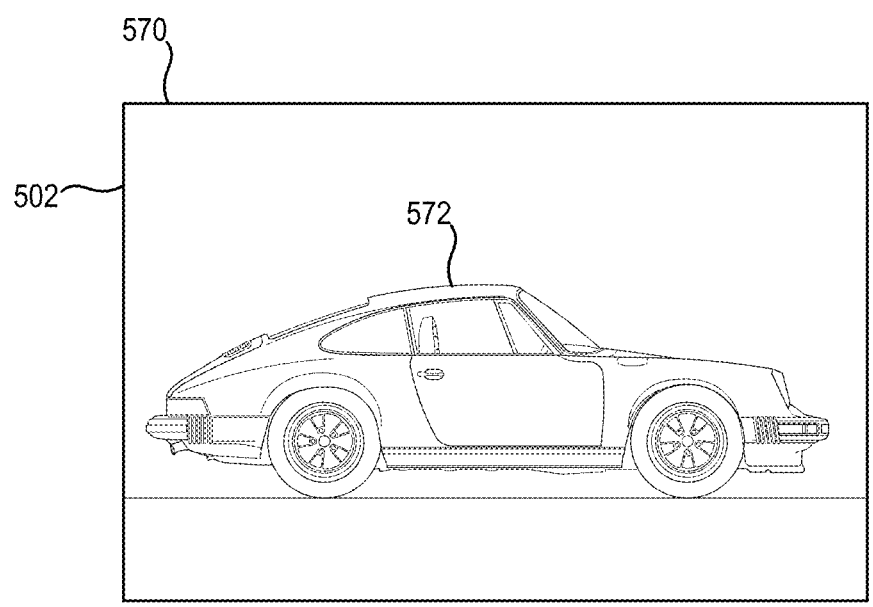

For example, FIG. 5H illustrates a virtual environment 570 displayed by the virtual reality device 502. The virtual environment 570 comprises a virtual car 572 simulating a real car. The digital AR/VR survey system 100 can conduct a survey by allowing a respondent to interact with the virtual car 572. For example, the digital AR/VR survey system 100 can detect that the user moves toward the front of the car and looks at the front profile. In response, the digital AR/VR survey system 100 can generate a survey question related to the front profile of the car (e.g., "what do you think about how the car looks from the front?"). The digital AR/VR survey system 100 can then determine response data from the user.

The digital AR/VR survey system 100 can also provide instructions for interacting with the virtual car 572. For example, the digital AR/VR survey system 100 can instruct the respondent to get into the front seat. Upon detecting that the respondent has entered the car, the digital AR/VR survey system 100 can detect additional user interactions. For example, the digital AR/VR survey system 100 can determine that the user looks at the dashboard. In response, the digital AR/VR survey system 100 can ask a survey question (e.g., "how do you think the radio looks within the overall design of the dashboard?"). In this manner, the digital AR/VR survey system 100 can provide an interactive digital survey that is based on user interactions with a virtual object.

The digital AR/VR survey system 100 can also determine correlations between user interactions and resulting impressions of a virtual object. For example, the digital AR/VR survey system 100 can detect that respondents that enter the virtual car 572 have a favorable impression at the end of the digital survey of the virtual car 572, whereas respondents that do not enter the virtual car 572 do not have a favorable impression at the end of the digital survey. Administrators can then utilize this information, for example, to encourage a sales force to have potential purchasers get into the vehicle before making a purchasing decision.

Although FIGS. 5A-5H illustrate visual elements in providing digital survey indicators and digital surveys, it will be appreciated that in one or more embodiments, the digital AR/VR survey system 100 utilizes auditory elements. Indeed, as described above in relation to augmented reality elements, in one or more embodiments, the digital AR/VR survey system 100 utilizes exclusively auditory elements to provide digital survey indicators and digital surveys in a virtual environment via a virtual reality device.

In addition to providing digital surveys, as mentioned previously, the digital AR/VR survey system 100 can also provide digital survey results via AR/VR devices. In particular, the digital AR/VR survey system 100 can analyze response data and generate survey results. Moreover, the digital AR/VR survey system 100 can provide survey results via an AR/VR device to provide administrators with more engaging (and/or timely) information. For instance, the digital AR/VR survey system 100 can provide digital survey results in relation to virtual elements (e.g., virtual representations of objects, products, or employees) or in relation to augmented reality elements (e.g., augmented reality elements displayed in relation to real-world environmental components).

Figure 6A:
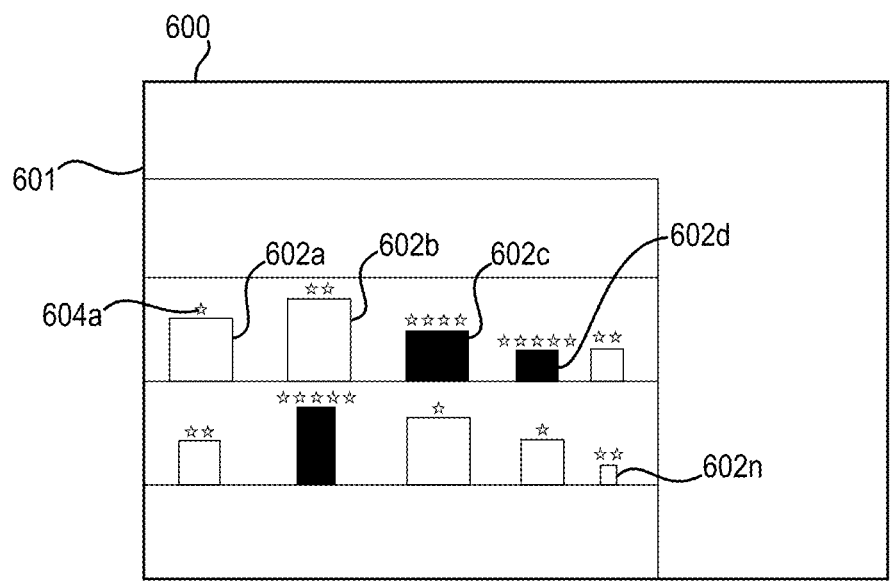
FIGS. 6A-6C illustrate representations of reporting survey results in relation to a virtual reality and/or augmented reality device in accordance with one or more embodiments.

For example, FIG. 6A illustrates a representation of providing results of a digital survey via a virtual reality device. Specifically, FIG. 6A shows a virtual environment 600 provided via a virtual reality device 601. The virtual environment 600 comprises a plurality of products 602a-602n on virtual shelves. As shown, the digital AR/VR survey system 100 can generate the plurality of products 602a-602n as virtual elements to provide information regarding results of one or more digital surveys.

For example, the digital AR/VR survey system 100 can generate virtual elements with a particular appearance to present survey results. In relation to FIG. 6A, the digital AR/VR survey system 100 generates the product 602a with a light shade, indicating that the product 602a has received below average survey results. Moreover, the digital AR/VR survey system 100 generates the product 602c with a dark shade, indicating that the product 602c has received above average survey results.

In addition, the digital AR/VR survey system 100 also provides the product 602a for display with a virtual element 604a indicating more detailed survey results. In particular, the virtual element 604a indicates a summary of ratings received during one or more digital surveys. Specifically, the virtual element 604a indicates that the product 602a received (on average) two out of five stars as reflected in response data to one or more digital surveys.

The digital AR/VR survey system 100 provide the virtual environment 600 such that users can interact with and immerse themselves within the virtual environment 600. For example, users can move within the virtual environment 600 to different virtual aisles to view different products. Notably, administrators can identify the highest performing products by simply looking at the provided virtual elements.

Similarly, a user can easily modify the virtual environment 600. For example, the user may wish to organize the products 602a-602n according to one or more product characteristics (e.g., price, highest survey results, profit margin, location within a store, or advertising expenditures). The user can interact with the virtual environment 600 (e.g., via one or more virtual drop down menus and/or selectable elements) and select one or more characteristics. In response, the digital AR/VR survey system 100 can present the virtual environment 600 with the products 602a-602n organized according to the selected characteristics. In this manner, administrators can easily and quickly utilize the virtual environment 600 to identify trends in the survey results, determine high performing products, identify poorly performing products, and make business decisions.

Although FIG. 6A illustrates a set of particular products (e.g., the products 602a-602n) arranged on virtual store shelves, it will be appreciated that the digital AR/VR survey system 100 can provide digital survey results regarding different subjects utilizing different virtual elements and different virtual environments. For example, the digital AR/VR survey system 100 can provide digital survey results regarding automobiles in a virtual show room. Similarly, the digital AR/VR survey system 100 can provide virtual results of an employee survey in a virtual office with avatars representing the individual employees (and virtual elements displayed in conjunction with the virtual employees indicating survey results).

Moreover, although FIG. 6A illustrates a representation of providing results via a virtual reality device, the digital AR/VR survey system 100 can also provide similar results utilizing an augmented reality device. For example, an augmented reality device can provide augmented reality elements overlaid on a view of a real-world environment (e.g., a real-world store) to provide survey results similar to the representation of FIG. 6A.

For example, in relation to FIG. 6A, rather than generating a virtual environment, the digital AR/VR survey system 100 can provide augmented reality elements via an augmented reality device in relation to real-world products on store shelves. In particular, the digital AR/VR survey system 100 can provide augmented reality elements in relation to real products 602a-602n that indicate survey results (e.g., green augmented reality elements in relation to products receiving higher scores and red augmented reality elements in relation to products receiving lower scores). Similarly, the digital AR/VR survey system 100 can provide the stars 604a as augmented reality elements in relation to the products 602a-602n. In this manner, the digital AR/VR survey system 100 can provide a store owner with real-time survey results regarding the store-owner's products. Indeed, the store-owner can identify and utilize survey results simply by walking around and looking at products via an augmented reality device.

In addition to providing survey results of products, the digital AR/VR survey system 100 can also utilize augmented reality devices to provide survey results in relation to a variety of other real-world environmental components (or augmented reality elements). For example, the digital AR/VR survey system 100 can provide survey results regarding a location, event, media content, business, person, employer, software application, and/or employer via augmented reality devices.

Figure 6B:
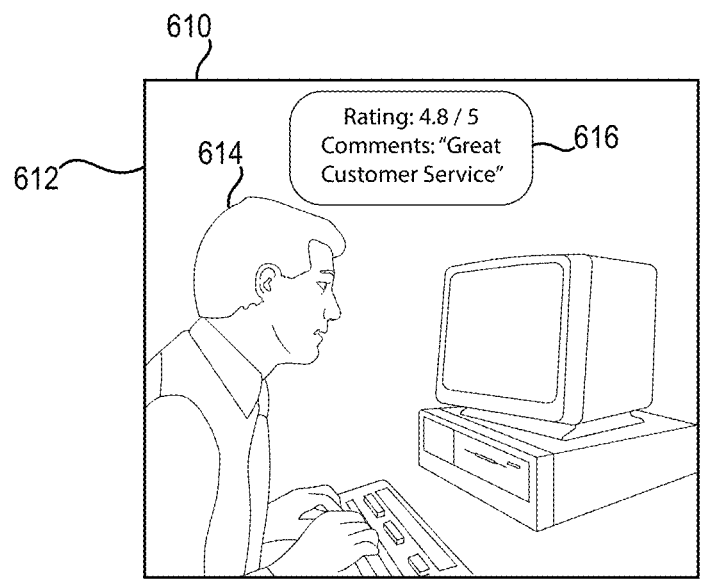

For example, FIG. 6B illustrates providing survey results via an augmented reality device in relation to an employee. Specifically, FIG. 6B illustrates a view 610 of an employee 614 (e.g., an employee of a call center) via an augmented reality device 612. In particular, an employer of the employee 614 utilizes the augmented reality device 612 and looks at the employee 614. In response, the digital AR/VR survey system 100 provides an augmented reality element 616 for display via the augmented reality device 612. The augmented reality element 616 provides survey results in relation to the employee 614 (e.g., an average rating based on survey response data from call participants and the most recent comment from a call participant).

In one or more embodiments, the digital AR/VR survey system 100 generates the augmented reality element 616 based on a database of survey results (e.g., processed response data). In particular, in relation to FIG. 6B, the digital AR/VR survey system 100 detects the employee 614 in the view 610 and determines survey results corresponding to the employee 614. Specifically, the digital AR/VR survey system 100 identifies the employee 614 (e.g., utilizing a facial recognition algorithm) and accesses a repository of survey results. The digital AR/VR survey system 100 searches the repository and identifies survey results corresponding to the employee 614. The digital AR/VR survey system 100 provides the survey results for display to the employer utilizing the augmented reality device 612 by generating the augmented reality element 616. In this manner, an employer can receive real-time survey results in relation to employee surveys simply by looking at employees utilizing an augmented reality device.

Figure 6C:
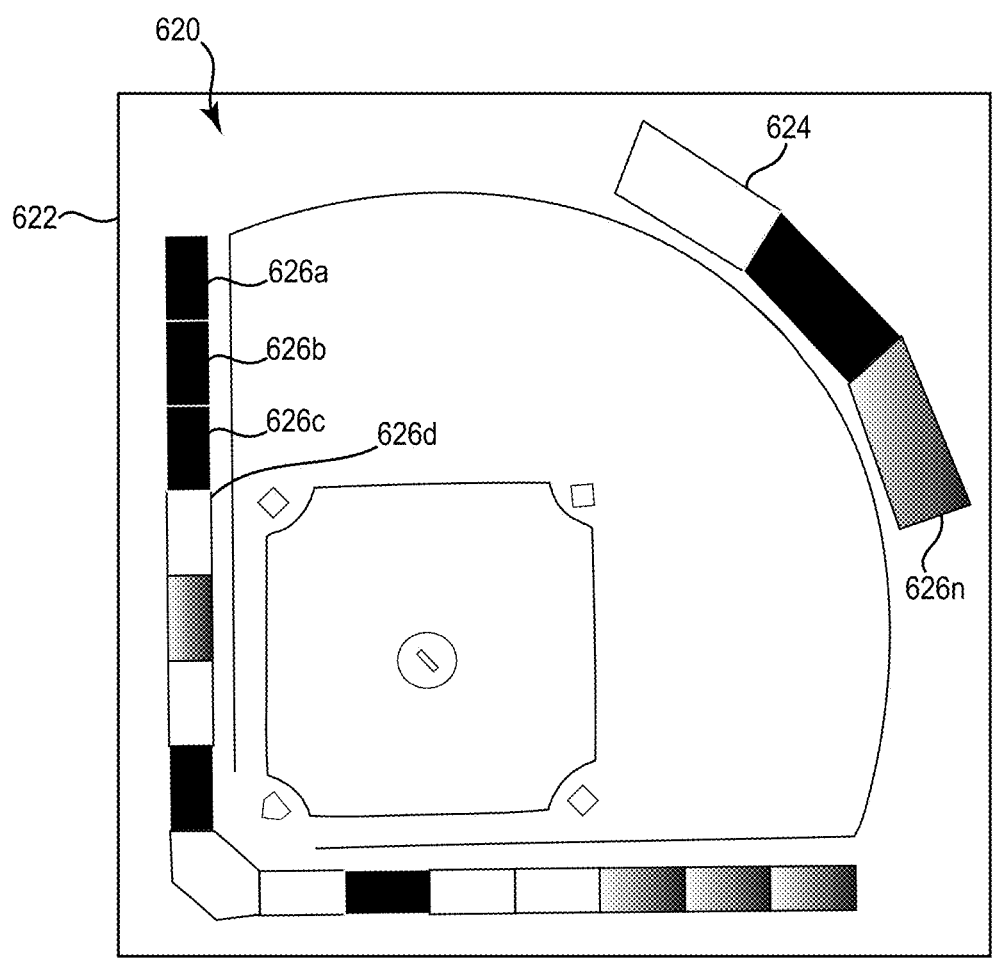

It will be appreciated that although FIGS. 6A-6B illustrate digital survey results in relation to individual products or employees, the digital AR/VR survey system 100 can provide digital survey results in relation to a plurality of individuals or products. For example, FIG. 6C illustrates providing digital survey results in relation to a plurality of individuals attending a baseball game. In particular, FIG. 6C illustrates an aerial view 620 via an augmented reality device 622 of a baseball stadium 624. The digital AR/VR survey system 100 provides augmented reality elements 626a-626n in relation to seating sections of the baseball stadium 624. The augmented reality elements 626a-626n indicate survey results of customer satisfaction surveys within the corresponding section of the baseball stadium 624.

Specifically, the digital AR/VR survey system 100 receives response data from customers at the baseball game. The digital AR/VR survey system 100 compiles the response data into data survey results (e.g., identifies average survey results in relation to all of the customers in each section). The digital AR/VR survey system 100 then provide augmented reality elements in relation to each section indicating the survey results. Accordingly, a manager of customer service employees can obtain real-time survey results, easily identify sections where customers are having concerns, and act to resolve the concerns to provide a better experience. Moreover, the digital AR/VR survey system 100 enables the manager to do so simply by looking at various sections utilizing an augmented reality device.

It will be appreciated that although the view 620 is an aerial view of the stadium, the digital AR/VR survey system 100 can provide an augmented reality element from any view. Thus, a manager (or owner) in the baseball stadium 624 can simply look around the stadium and the digital AR/VR survey system 100 can provide augmented reality elements that allow the manager to see survey results in relation to each section.

It will be appreciated that, in addition to providing augmented reality elements corresponding to a plurality of individuals, the digital AR/VR survey system 100 can also provide augmented reality elements in relation to individual customers. For example, the digital AR/VR survey system 100 can also provide augmented reality elements displaying customer comments in response to a digital survey in relation to the customer that provided the comment.

Furthermore, although FIG. 6C illustrates providing digital survey results in relation to a baseball stadium, it will be appreciated that the digital AR/VR survey system 100 can provide digital survey results in any real-world environment. For example, the digital AR/VR survey system 100 can calculate digital survey results from passengers on an airplane and provide an augmented reality element in relation to the plane (e.g., as it lands) so that airline employees can identify flights that have positive or negative experiences. Similarly, the digital AR/VR survey system 100 can provide augmented reality elements in relation to individual airline passengers as they exit an airplane so that airline employees can assist those that had a negative experience or identify those passengers that had a positive experience for further feedback.

It will be appreciated that the digital AR/VR survey system 100 can provide digital survey results in relation to any type of response data, including response data gathered in relation to AR/VR devices (or other devices). For example, the digital AR/VR survey system 100 can provide digital survey results in relation to response data gathered via an augmented reality device. To illustrate, a store owner may wish to modify a store layout. The digital AR/VR survey system 100 can generate a virtual environment that comprises a virtual store that simulates various configurations of the real store. The digital AR/VR survey system 100 can then administer the digital survey to respondents via virtual reality devices. For instance, the digital AR/VR survey system 100 can have respondents move through various configurations of the virtual store (e.g., attempting to find particular products depending on different layouts) and gather response data (e.g., monitoring how the respondents moved through the store and ask questions). The digital AR/VR survey system 100 can then provide the survey results via a virtual reality device to the store owner. For instance, the digital AR/VR survey system 100 can recreate the virtual environment and provide virtual elements that track how the respondents moved through the store in search of particular products. The digital AR/VR survey system 100 can also display comments from the respondents via the virtual environment (e.g., as the respondents move through the store). The digital AR/VR survey system 100 can also provide virtual elements to indicate patterns of movement through the store (e.g., hot spots more frequently traveled and cold spots that were less frequently traveled). In this manner, the digital AR/VR survey system 100 can provide results of a digital survey conducted via a virtual reality device via another virtual reality device.

The digital AR/VR survey system 100 can also provide results of a survey conducted via an AR/VR device via an augmented reality device. For instance, individuals that generate digital surveys for response from other users can also display the survey results to other users. For example, in relation to the survey question 464 of FIG. 4H, the digital AR/VR survey system 100 can generate an augmented reality element that shows results of the digital survey. For example, upon user interaction with one of the selectable options 464a-464b, the digital AR/VR survey system 100 can provide an augmented reality element that indicates digital survey results (e.g., 47% thumbs up, 53% thumbs down).

Figure 7:
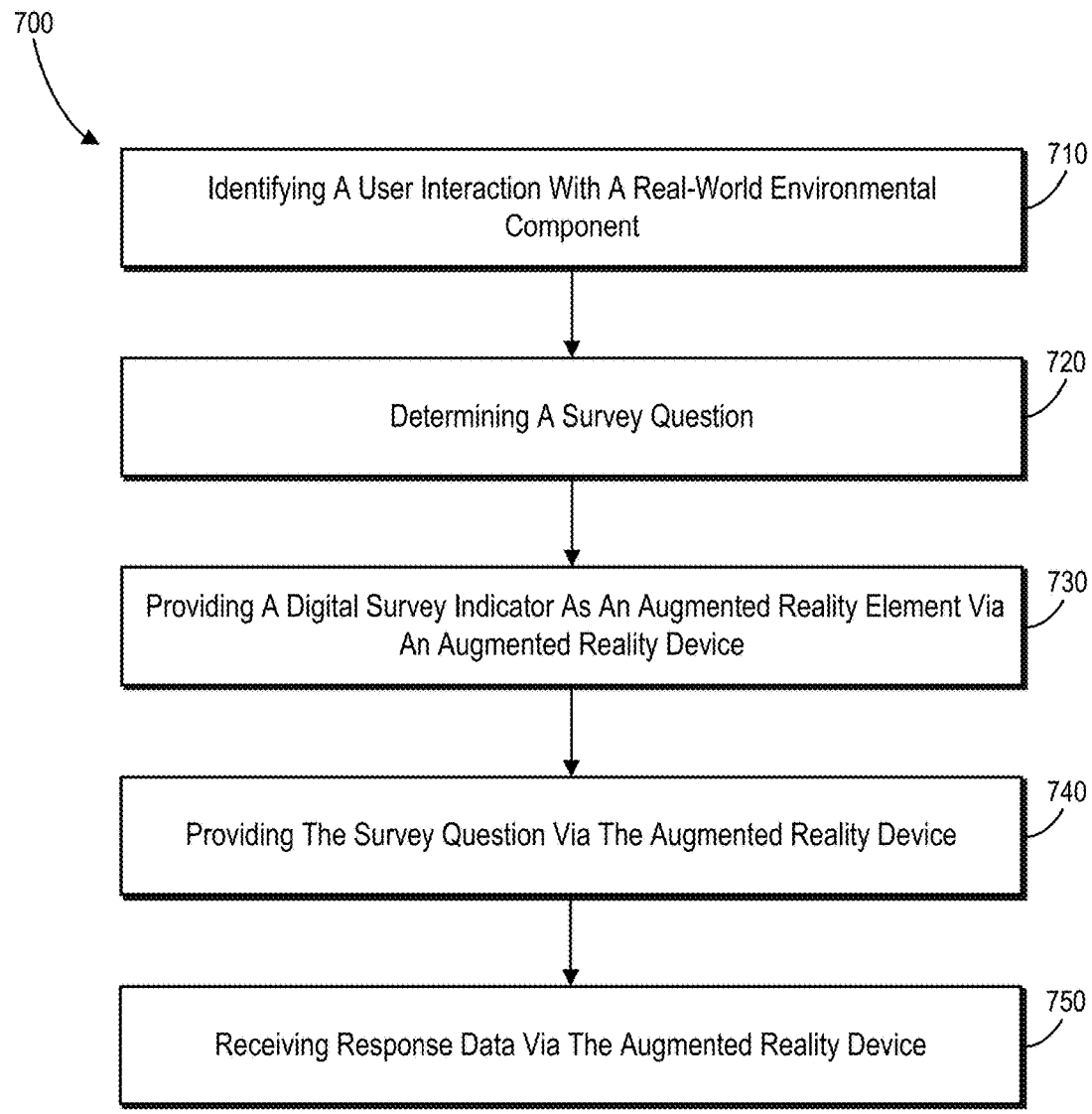
FIG. 7 illustrates a flowchart of a series of acts in a method of providing a digital survey via an augmented reality device in accordance with one or more embodiments.
Figure 8:
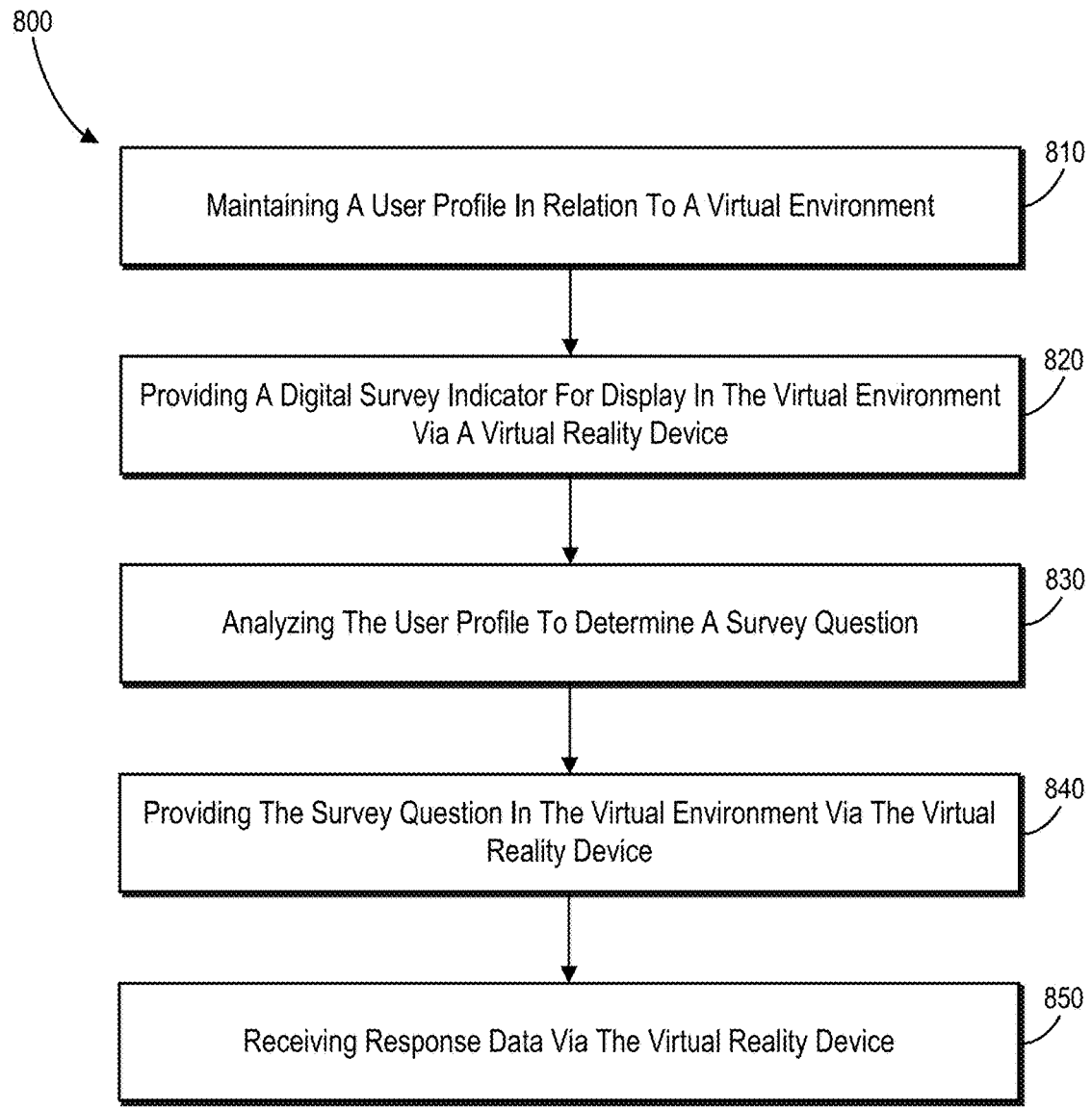
FIG. 8 illustrates a flowchart of a series of acts in a method of providing a digital survey via a virtual reality device in accordance with one or more embodiments.

FIGS. 1-6C, the corresponding text, and the examples, provide a number of different systems, devices, and interfaces for providing digital surveys via AR/VR devices. In addition to the foregoing, embodiments disclosed herein also can be described in terms of flowcharts comprising acts and steps in a method for accomplishing a particular result. For example, FIGS. 7-8 illustrates flowcharts of exemplary methods in accordance with one or more embodiments disclosed herein. The methods described in relation to FIGS. 7-8 can be performed with less or more steps/acts or the steps/acts can be performed in differing orders. Additionally, the steps/acts described herein can be repeated or performed in parallel with one another or in parallel with different instances of the same or similar steps/acts.

FIG. 7 illustrates a flowchart of a method 700 for providing digital surveys via an augmented reality device. The method 700 can be implemented by the digital AR/VR survey system 100 described above. As shown, the method 700 includes an act 710 of identifying a user interaction with a real-world environmental component. In particular, the act 710 can include identifying a user interaction with a real-world environmental component from data received from an augmented reality device of a user. For example, in one or more embodiments, the act 710 comprises determining, via the augmented reality device, that the user is at a location; determining, via the augmented reality device, that the user is interacting with an object; or determining, via the augmented reality device, that the user is engaged in an activity.

In addition, as shown in FIG. 7, the method 700 also includes an act 720 of determining a survey question. In particular, the act 720 can include in response to the identified user interaction with the real-world environmental component, determining a survey question to provide to the user of the augmented reality device. For example, in one or more embodiments, the act 720 comprises identifying a survey question corresponding to the identified user interaction with the real-world environmental component.

As illustrated in FIG. 7, the method 700 also includes an act 730 of providing a digital survey indicator as an augmented reality element via an augmented reality device. In particular, the act 730 can include providing, to the augmented reality device of the user, a digital survey indicator as an augmented reality element positioned in relation to the real-world environmental component. For example, in one or more embodiments (e.g., where identifying the user interaction with the real-world environmental component comprises determining, via the augmented reality device, that the user is viewing an object), the act 730 comprises providing the augmented reality element for display within a proximity of the object via the augmented reality device As shown in FIG. 7, the method 700 also includes an act 740 of providing the survey question via the augmented reality device. In particular, the act 740 includes, based on receiving an indication of user interaction with the digital survey indicator, providing, to the augmented reality device and for presentation to the user, the survey question. For example, in one or more embodiments, the act 740 comprises providing for display a text survey question and a plurality of text answers as a second augmented reality element via the augmented reality device. In addition, the act 740 can include providing an audible survey question via the augmented reality device.

Moreover, as illustrated in FIG. 7, the method 700 also includes an act 750 of receiving response data via the augmented reality device. In particular, the act 750 can include receiving response data collected from the augmented reality device in response to the survey question. For example, in one or more embodiments, the act 750 comprises receiving an indication that the user has selected one of the plurality of text answers from the second augmented reality element.

In addition, the method 700 can also include in response to receiving the response data collected from the augmented reality device in response to the survey question, providing for presentation to the user an instruction to perform an action as a second augmented reality element via the augmented reality device. Further, in one or more embodiments, the method 700 also comprises identifying performance of the action by the user via the augmented reality device. In addition, the method 700 can also include, in response to identifying performance of the action by the user, providing for presentation to the user a second survey question corresponding to the performance of the action by the user.

FIG. 8 illustrates another flowchart of a method 800 for providing digital surveys via a virtual reality device. As illustrated, the method 800 includes an act 810 of maintaining a user profile in relation to a virtual environment. In particular, the act 810 can include maintaining a user profile of a user of a virtual reality device by monitoring user interactions in relation to a virtual environment. For example, in one or more embodiments, the act 810 comprises monitoring one or more locations visited by the user in the virtual environment; or monitoring user interaction with one or more objects in the virtual environment.

In addition, as shown in FIG. 8, the method 800 also includes an act 820 of providing a digital survey indicator for display in the virtual environment via a virtual reality device. In particular, the act 810 can include, based on identifying a new user interaction associated with the user in the virtual environment, providing a digital survey indicator for display to the user in the virtual environment via the virtual reality device. For example, in one or more embodiments, the act 820 comprises receiving an indication of a location corresponding to the user in the virtual environment; or receiving an indication of user interaction by the user with an object in the virtual environment.

Furthermore, the act 820 can include providing the digital survey indicator for display in association with an object in the virtual environment. For instance, the act 820 can include determining a correspondence between the new user interaction and the object in the virtual environment; and based on the determined correspondence, providing the digital survey indicator for display in association with the object in the virtual environment. Moreover, the act 820 can include providing for display an indication of a virtual survey room.

Further, as shown in FIG. 8, the method 800 also includes an act 830 of analyzing the user profile to determine a survey question. In particular, the act 830 can include analyzing the user profile and the monitored user interactions of the user of the virtual reality device to determine a survey question to provide to the user. For instance, the act 830 can include searching a database of survey questions and corresponding user interactions; identifying the monitored user interactions in the database; and providing the survey question corresponding to the monitored user interactions in the database.

As illustrated in FIG. 8, the method 800 also includes an act 840 of providing the survey question in the virtual environment via the virtual reality device. In particular, the act 840 can include based on receiving an indication of a user interaction with the digital survey indicator in the virtual environment, providing for presentation to the user the survey question in the virtual environment. For example, in one or more embodiments (e.g., where providing the digital survey indicator comprises providing for display an indication of a virtual survey room), the act 840 comprises providing for display the survey questions in the virtual survey room.

As shown in FIG. 8, the method 800 also includes an act 850 of receiving response data via the virtual reality device. In particular, the act 850 can include receiving response data collected from the virtual reality device in response to the survey question. For example, in one or more embodiments, the act 850 comprises receiving an indication of a gesture from the user via the virtual reality device; receiving an indication of an audible response from the user via the virtual reality device; receiving an indication of a direction the user is looking via the virtual reality device; or receiving an indication of movement corresponding to the user in the virtual environment. In addition, the act 850 can include receiving biometric data collected from the virtual reality device, wherein biometric data comprises at least one of: heart rate data, blood pressure, body temperature, or breathing rate.

In one or more embodiments, the method 800 also includes providing for display response data from the user and a plurality of additional users for display via a second virtual reality device. In particular, the method 800 can include generating survey results from response data; and providing the survey results via the second virtual reality device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
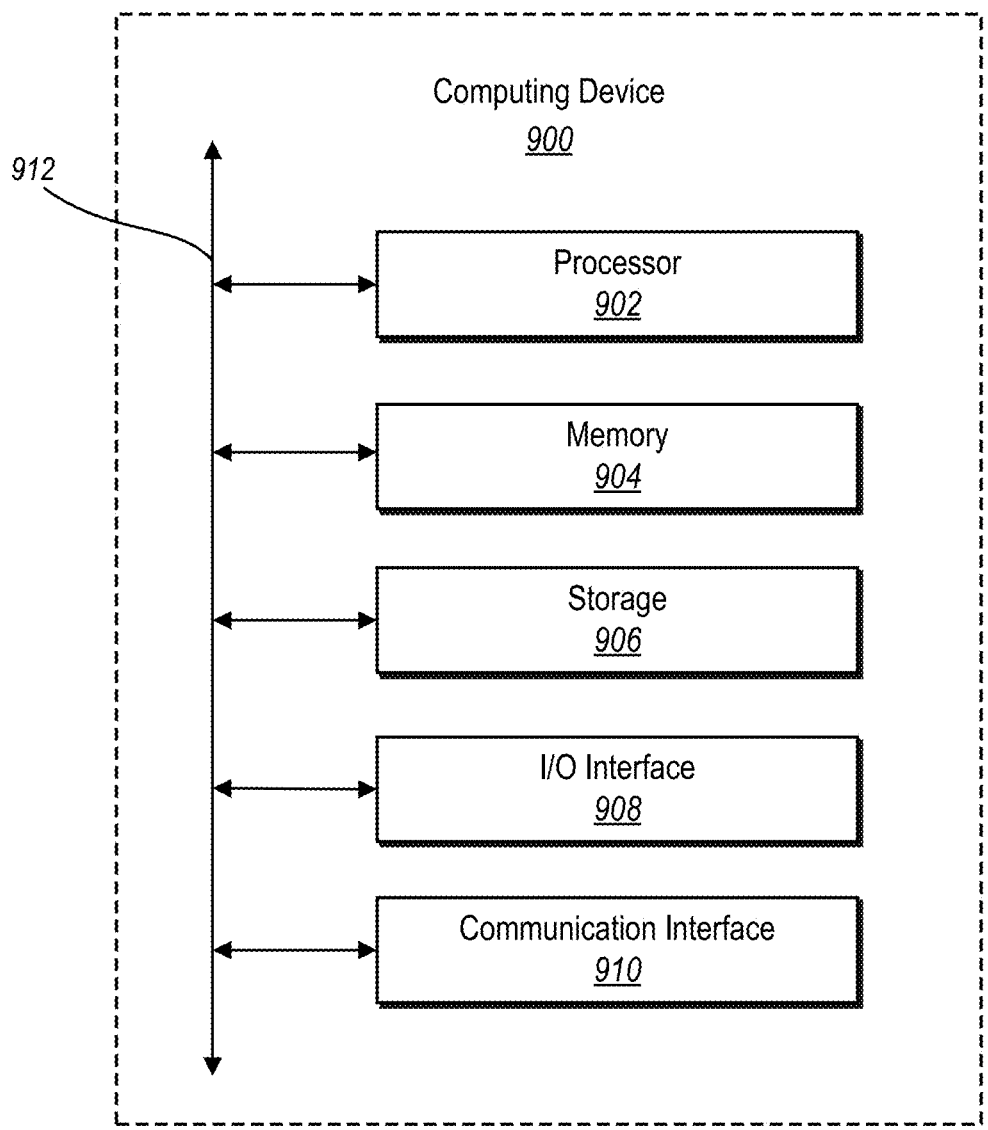
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the digital AR/VR survey system 100, the administrator device 202, the respondent devices 204a-204n, the server(s) 206, the virtual reality device 301, the augmented reality device 402, the virtual reality device 502, the virtual reality device 601, the augmented reality device 612, and/or the augmented reality device 622. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols.

Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
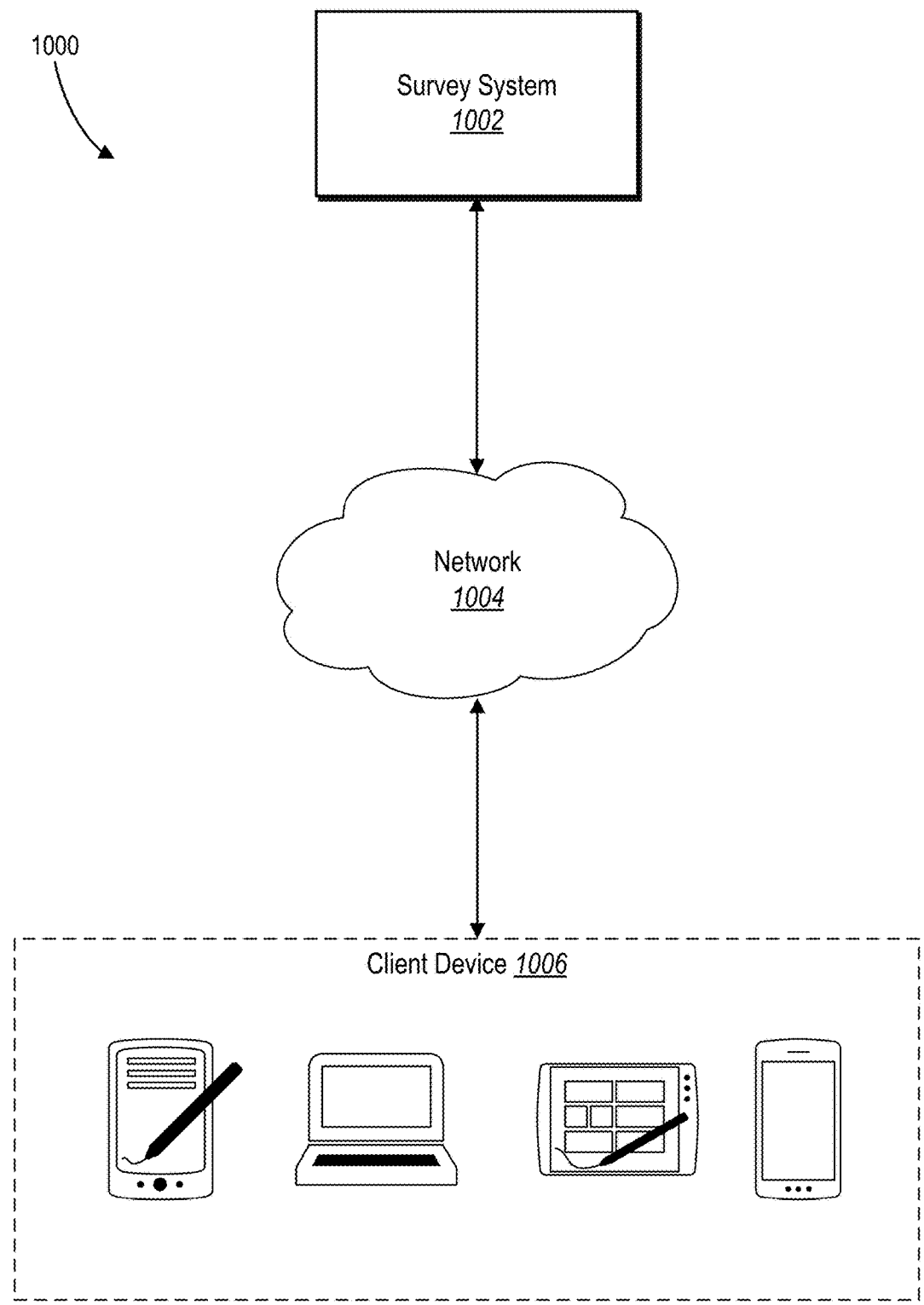
FIG. 10 illustrates an example network environment of a survey management system in accordance with one or more embodiments.

FIG. 10 illustrates an example network environment 1000 of a survey management system, such as the digital AR/VR survey system 100. Network environment 1000 includes a client system 1006, and a survey management system 1002 connected to each other by a network 1004. Although FIG. 10 illustrates a particular arrangement of client system 1006, survey management system 1002, and network 1004, this disclosure contemplates any suitable arrangement of client system 1006, survey management system 1002, and network 1004. As an example and not by way of limitation, two or more of client system 1006, and survey management system 1002 may be connected to each other directly, bypassing network 1004.

As another example, two or more of client system 1006 and survey management system 1002 may be physically or logically co-located with each other in whole, or in part. Moreover, although FIG. 10 illustrates a particular number of client systems 1006, survey management systems 1002, and networks 1004, this disclosure contemplates any suitable number of client systems 1006, survey management systems 1002, and networks 1004. As an example and not by way of limitation, network environment 1000 may include multiple client systems 1006, survey management systems 1002, and networks 1004.

This disclosure contemplates any suitable network 1004. As an example and not by way of limitation, one or more portions of network 1004 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, or a combination of two or more of these. Network 1004 may include one or more networks.

Links may connect client system 1006, and survey management system 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client system 1006 may be an electronic device including hardware, software, or embedded logic components or a combination of two or more such components and capable of carrying out the appropriate functionalities implemented or supported by client system 1006. As an example and not by way of limitation, a client system 1006 may include any of the computing devices discussed above in relation to FIG. 8. A client system 1006 may enable a network user at client system 1006 to access network 1004. A client system 1006 may enable its user to communicate with other users at other client systems 1006.

In particular embodiments, client system 1006 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1006 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 1006 one or more Hyper Text Markup Language (HTML) files responsive to the HTTP request. Client system 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey management system 1002 may include a variety of servers, sub-systems, programs, modules, logs, and data stores. In particular embodiments, survey management system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey management system 1002 may also include suitable components such as network interfaces, security mechanisms, load balancers, failover servers, management-and-network-operations consoles, other suitable components, or any suitable combination thereof.

In particular embodiments, survey management system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories and categories may be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:
1. A method comprising:
   identifying a user interaction with a real-world environmental component from data received from an augmented reality device of a user;
   determining a survey question relating to the real-world environment component to provide to the user of the augmented reality device based on the identified user interaction with the real-world environmental component;
   providing, to the augmented reality device of the user, a digital survey indicator corresponding to the survey question relating to the real-world environmental component as an augmented reality element displayed in relation to the real-world environmental component;
   based on receiving an indication of user interaction with the digital survey indicator displayed in relation to the real-world environmental component, providing, to the augmented reality device and for presentation to the user, the survey question related to the real-world environmental component as an additional augmented reality element displayed in relation to the real-world environmental component; and
   receiving response data collected from the augmented reality device in response to the survey question.
2. The method of claim 1, wherein identifying the user interaction with the real-world environmental component comprises at least one of: determining, via the augmented reality device, that the user is at a location; or determining, via the augmented reality device, that the user is interacting with an object.
3. The method of claim 1, further comprising:
   comparing the user interaction with the real-world environmental component with a pre-determined triggering event to determine satisfaction of the pre-determined triggering event; and
   providing the digital survey indicator based on satisfaction of the pre-determined triggering event.
4. The method of claim 1, wherein:
   identifying the user interaction with the real-world environmental component from data received from the augmented reality device of the user comprises: determining, via the augmented reality device, that the user is viewing an object; and
   providing the digital survey indicator as the augmented reality element in relation to the real-world environmental component comprises: providing the augmented reality element for display within a proximity of the object via the augmented reality device.
5. The method of claim 1, wherein providing the survey question comprises providing for display a text survey question and a plurality of text answers as the additional augmented reality element.
6. The method of claim 5, wherein receiving response data collected from the augmented reality device in response to the survey question comprises receiving an indication that the user has selected one of the plurality of text answers from the additional augmented reality element.
7. The method of claim 1, wherein:
   providing the digital survey indicator comprises providing an audible indication via the augmented reality device that a digital survey is available; and
   providing the survey question comprises providing an audible survey question via the augmented reality device.
8. The method of claim 1, further comprising, in response to receiving the response data collected from the augmented reality device in response to the survey question, providing for presentation to the user an instruction to perform an action as a further augmented reality element via the augmented reality device.
9. The method of claim 8, further comprising identifying performance of the action by the user via the augmented reality device.
10. The method of claim 9, further comprising, in response to identifying performance of the action by the user, providing for presentation to the user a second survey question corresponding to the performance of the action by the user.
11. A method comprising:
   maintaining a user profile of a user of a virtual reality device by monitoring user interactions in relation to a virtual environment;
   based on identifying a new user interaction associated with the user in the virtual environment, providing a digital survey indicator for presentation to the user in the virtual environment via the virtual reality device;
   analyzing the user profile and the monitored user interactions of the user of the virtual reality device to determine a survey question to provide to the user;
   based on receiving an indication of a user interaction with the digital survey indicator in the virtual environment, providing for presentation to the user the survey question in the virtual environment; and receiving response data collected from the virtual reality device in response to the survey question.

12. The method of claim 11, wherein monitoring user interactions of the user comprises at least one of: monitoring one or more locations visited by the user in the virtual environment; or monitoring user interaction with one or more objects in the virtual environment.

13. The method of claim 11, wherein receiving the new user interaction comprises at least one of: receiving an indication of a location corresponding to the user in the virtual environment; or receiving an indication of user interaction by the user with an object in the virtual environment.

14. The method of claim 11, wherein providing the digital survey indicator for presentation comprises providing the digital survey indicator for display in association with an object in the virtual environment.

15. The method of claim 14, further comprising:
determining a correspondence between the new user interaction and the object in the virtual environment; and
based on the determined correspondence, providing the digital survey indicator for display in association with the object in the virtual environment.

16. The method of claim 11, wherein:
providing the digital survey indicator comprises providing for display an indication of a virtual survey room; and
providing for presentation to the user the survey question in the virtual environment comprises providing for display the survey questions in the virtual survey room.

17. The method of claim 11, wherein receiving response data collected from the virtual reality device in response to the survey question comprises at least one of: receiving an indication of a gesture from the user via the virtual reality device; receiving an indication of an audible response from the user via the virtual reality device; receiving an indication of a direction the user is looking via the virtual reality device; or receiving an indication of movement corresponding to the user in the virtual environment.

18. The method of claim 11, wherein receiving response data collected from the virtual reality device in response to the survey question comprises receiving biometric data collected from the virtual reality device, and wherein biometric data comprises at least one of: heart rate data, blood pressure, body temperature, or breathing rate.

19. The method of claim 11, further comprising, providing for display response data from the user and a plurality of additional users for display via a second virtual reality device.

20. A system comprising:
at least one processor; and
at least one non-transitory computer readable storage medium storing instructions that, when executed by at least one processor, cause the system to:
identify a user interaction with a real-world environmental component from data received from an augmented reality device of a user;
determine a survey question relating to the real-world environmental component to provide to the user of the augmented reality device based on the identified user interaction with the real-world environmental component;
provide, to the augmented reality device of the user, a digital survey indicator corresponding to the real-world environmental component as an augmented reality element displayed in relation to the real-world environmental component;
based on receiving an indication of user interaction with the digital survey indicator displayed in relation to the real-world environmental component, provide, to the augmented reality device and for presentation to the user, the survey question related to the real-world environmental component as an additional augmented reality element displayed in relation to the real-world environmental component; and
receive response data collected from the augmented reality device in response to the survey question.

* * * * *